US008447851B1

(12) United States Patent
Anderson et al.

(10) Patent No.: US 8,447,851 B1
(45) Date of Patent: May 21, 2013

(54) SYSTEM FOR MONITORING ELASTIC CLOUD-BASED COMPUTING SYSTEMS AS A SERVICE

(75) Inventors: Eric Paul Anderson, Pflugerville, TX (US); Scott Conrad Johnson, Austin, TX (US); David Perdue, Austin, TX (US); Luke Ehresman, Holly Springs, NC (US); Robert B Gordon, Austin, TX (US)

(73) Assignee: CopperEgg Corporation, Pflugerville, TX (US)

( * ) Notice: Subject to any disclaimer, the term of this patent is extended or adjusted under 35 U.S.C. 154(b) by 0 days.

(21) Appl. No.: 13/293,751

(22) Filed: Nov. 10, 2011

(51) Int. Cl.
*G06F 15/173* (2006.01)

(52) U.S. Cl.
USPC ........... 709/223; 709/224; 709/217; 707/600; 715/736

(58) Field of Classification Search
USPC ............ 709/223–224, 217; 707/600; 715/736
See application file for complete search history.

(56) References Cited

U.S. PATENT DOCUMENTS

| | | | | |
|---|---|---|---|---|
| 5,958,008 | A * | 9/1999 | Pogrebisky et al. | 709/223 |
| 7,930,381 | B2 * | 4/2011 | Attanasio et al. | 709/223 |
| 7,991,876 | B2 * | 8/2011 | Yoda et al. | 709/224 |
| 2003/0065986 | A1 * | 4/2003 | Fraenkel et al. | 714/47 |
| 2003/0097438 | A1 | 5/2003 | Bearden et al. | |
| 2003/0135611 | A1 * | 7/2003 | Kemp et al. | 709/224 |
| 2003/0204588 | A1 * | 10/2003 | Peebles et al. | 709/224 |
| 2004/0148237 | A1 * | 7/2004 | Bittmann et al. | 705/35 |
| 2005/0169285 | A1 | 8/2005 | Wills et al. | |
| 2005/0182960 | A1 * | 8/2005 | Petry et al. | 713/200 |
| 2006/0059568 | A1 * | 3/2006 | Smith-Mickelson et al. | 726/27 |
| 2006/0075093 | A1 * | 4/2006 | Frattura et al. | 709/224 |
| 2008/0275980 | A1 * | 11/2008 | Hansen | 709/224 |
| 2008/0301282 | A1 * | 12/2008 | Coleman | 709/224 |
| 2009/0010277 | A1 * | 1/2009 | Halbraich et al. | 370/465 |
| 2009/0222551 | A1 * | 9/2009 | Neely et al. | 709/224 |
| 2009/0287814 | A1 * | 11/2009 | Robertson et al. | 709/224 |
| 2009/0319658 | A1 | 12/2009 | Chioiu et al. | |
| 2010/0027552 | A1 * | 2/2010 | Hill | 370/401 |
| 2010/0057400 | A1 * | 3/2010 | Chou et al. | 702/182 |
| 2010/0100778 | A1 | 4/2010 | Sullivan | |
| 2010/0138291 | A1 * | 6/2010 | Silverman et al. | 705/14.45 |
| 2010/0167658 | A1 | 7/2010 | Hoffman | |

(Continued)

OTHER PUBLICATIONS

Merv Adrian and Colin White, "Analytic Platforms: Beyond the Traditional Data Warehouse," Beye Network Global Coverage of the Business Intelligence Ecosystem, TechTarget, BI Research, IT Market Strategy, 2010.*

(Continued)

*Primary Examiner* — Alina N. Boutah
(74) *Attorney, Agent, or Firm* — Bracewell & Guiliani LLP.

(57) ABSTRACT

Provided is a computing-system monitor configured to monitor a plurality of computing-systems each having a plurality of monitored computing-instances. The computing-system monitor may include a plurality of collectors, each collector executed by one of a plurality of monitored computing-instances, wherein the plurality of monitored computing-instances each are part of one of a plurality of separately monitored computing systems, and wherein each of the collectors is operable to output metrics of a corresponding monitored computing-instance executing that collector. The computing-system monitor may also include an analytics platform, the analytics platform having a plurality of analytic computing-instances, the analytics platform being operable to receive metrics output by the plurality of collectors, calculate statistics with the analytic computing-instances based on the received metrics, and output the calculated statistics.

7 Claims, 11 Drawing Sheets

U.S. PATENT DOCUMENTS

| | | | |
|---|---|---|---|
| 2010/0169477 A1* | 7/2010 | Stienhans et al. | 709/224 |
| 2010/0169567 A1* | 7/2010 | Huang et al. | 711/112 |
| 2010/0174782 A1* | 7/2010 | Rose | 709/204 |
| 2010/0223256 A1* | 9/2010 | Chalana et al. | 707/718 |
| 2010/0306767 A1 | 12/2010 | Dehaan | |
| 2011/0029810 A1 | 2/2011 | Jaisinghani | |
| 2011/0047287 A1* | 2/2011 | Harrang et al. | 709/235 |
| 2011/0082946 A1* | 4/2011 | Gopalakrishnan | 709/231 |
| 2011/0145836 A1* | 6/2011 | Wheeler et al. | 719/314 |
| 2011/0161338 A1 | 6/2011 | Moore | |
| 2011/0167469 A1 | 7/2011 | Letca et al. | |
| 2011/0179162 A1* | 7/2011 | Mayo et al. | 709/224 |
| 2011/0179165 A1* | 7/2011 | Ravichandran | 709/224 |
| 2011/0238781 A1* | 9/2011 | Okun et al. | 709/217 |
| 2011/0252137 A1* | 10/2011 | Stienhans et al. | 709/224 |
| 2011/0258621 A1* | 10/2011 | Kern | 718/1 |
| 2011/0258683 A1* | 10/2011 | Cicchitto | 726/4 |
| 2011/0276951 A1* | 11/2011 | Jain | 717/140 |
| 2011/0295651 A1* | 12/2011 | Pairault et al. | 705/7.36 |
| 2011/0295999 A1* | 12/2011 | Ferris et al. | 709/224 |
| 2011/0296000 A1* | 12/2011 | Ferris et al. | 709/224 |
| 2011/0302296 A1* | 12/2011 | Garrett et al. | 709/224 |
| 2011/0314148 A1* | 12/2011 | Petersen et al. | 709/224 |
| 2011/0320564 A1* | 12/2011 | Karkanias et al. | 709/217 |
| 2012/0016981 A1* | 1/2012 | Clemm et al. | 709/224 |
| 2012/0017156 A1* | 1/2012 | Broda et al. | 715/736 |
| 2012/0054301 A1* | 3/2012 | Kieselbach | 709/217 |
| 2012/0054335 A1* | 3/2012 | Kieselbach | 709/224 |
| 2012/0130781 A1* | 5/2012 | Li | 705/14.4 |
| 2012/0151047 A1* | 6/2012 | Hodges et al. | 709/224 |
| 2012/0167081 A1* | 6/2012 | Sedayao et al. | 718/1 |
| 2012/0185913 A1* | 7/2012 | Martinez et al. | 726/1 |
| 2012/0208495 A1* | 8/2012 | Lawson et al. | 455/406 |
| 2012/0209568 A1* | 8/2012 | Arndt et al. | 702/183 |
| 2012/0221626 A1* | 8/2012 | Ferris | 709/203 |
| 2012/0222084 A1* | 8/2012 | Beaty et al. | 726/1 |
| 2012/0226808 A1* | 9/2012 | Morgan | 709/226 |

OTHER PUBLICATIONS

Ricknäs, Michael, "Amazon adds CloudWatch to management tool," available via the Internet at http://www.infoworld.com/d/cloud-computing/amazon-adds-cloudwatch-management-tool-502.pdf, Jan. 26, 2011, pp. 1-3.

"Zyrion's Traverse Brings Proven BSM Advantages to Challenging Distributed Datacenter Environments," Dec. 15, 2009, pp. 1-4.

Kelly, Patrick, "White paper for IBM," Bharti Airtel SMC Univision, Mar. 2010, Title page, Contents page and pp. 1-10 (total of 12 pp.).

De Gelas, John, "Infrastructure as a Service: Benchmarking Cloud Computing," available via the Internet at http://www.anandtech.com/show/4349/infrastructure-as-a-service-benchmarking-cloud-computing, Jun. 2, 2011, pp. 1-6.

Ramm, Mark, "The Watcher Knows," available via the Internet at http://www.linux-mag.com/id/1890, Mar. 15, 2005, pp. 1-5.

"Security in SNMPv3 versus SNMPv1 or v2c," SNMP Research International, Inc., 2002, pp. 1-6.

"Skytap Announces Over One Million Virtual Machines Launched," available via the Internet at http://www.skytap.com/news-events/press-releases/skytap-announces-over-one-million-virtual-machines-launched, Skytap, Inc., 2011, pp. 1-2.

Schoenwaelder, J., "Simple Network Management Protocol (SNMP) Context EngineID Discovery," available via the Internet at http://tools.ietf.org/html/rfc5343, Network Working Group, Sep. 2008, pp. 1-10.

Case, J., et al., "A Simple Network Management Protocol (SNMP)," available via the Internet at http://tools.ietf.org/html/rfc1157, Network Working Group, May 1990, pp. 1-37.

Mukhar, Nicholas, "Zyrion Expands to Cloud Infrastructure Monitoring," available via the Internet at http://www.mspmentor.net/2011/02/08/zyrion-expands-to-cloud-infrastructure-monitoring, Feb. 8, 2011, pp. 1-9.

\* cited by examiner

SYSTEM FOR MONITORING ELASTIC CLOUD-BASED COMPUTING SYSTEMS AS A SERVICE

BACKGROUND OF THE INVENTION

1. Field of the Invention

The present invention relates generally to computing systems, and more specifically, to monitoring the operation of computing systems.

2. Description of the Related Art

Systems management programs are often used for monitoring groups of computing devices, such as a group of personal computers deployed within a company's local area network. Generally, some systems management programs are configured to monitor the performance, usage, configuration, and network activity of each of the computing devices in the system. Some such systems management programs obtain data from programs, referred to as agents, executed by each of the computing devices. The agents gather data at the computing device, and the systems management program generally coordinates the operation of the agents by establishing connections with the agents and requesting the agents to report data back to the systems management program, often by periodically polling the agents for data.

Generally, existing systems management programs are not well-suited for monitoring the operation of relatively large computing systems, multiple computing systems, or computing systems in which constituent computing devices are frequently added or removed. Configuring system management programs is often relatively labor-intensive, as certain such programs require an operator to identify, and configure the program for, each new computing device added to the system. Further, relatively large computing systems or multiple computing systems generally yield relatively large amounts of data, as each computing device in the system may be an additional potential source of information to be monitored.

These inadequacies are particularly challenging for those monitoring computing systems in a data center or other scalable computing system, such as computing systems operating in a cloud-based virtual data center. Often such computing systems are designed to be scalable, such that new computing devices or virtual machines are provisioned based on the load placed on the computing system. As a result, in some use cases, new computing devices or new virtual machines (that is, computing instances of the computing system) are added and removed relatively frequently as demand fluctuates. These transient computing instances are difficult for certain existing system management programs to effectively monitor, as the amount of data generated can be potentially relatively large and the new instances often go unnoticed and unmonitored by the systems management program until the systems management program is reconfigured to establish a connection with the new computing instances and request data from them. Further, systems management programs are often configured by technicians with relatively specialized knowledge, but such persons are often not in the employ of entities operating cloud-based virtual data centers, which are often specifically designed to be used by entities without specialized expertise in the operation and maintenance of such computing systems. Moreover, because such computing systems are often accessed over the Internet, rather than a local area network under the control of a single entity, the connection between the systems management program and the monitored computing instances is often less reliable, which can result in uneven data flows that could potentially overwhelm the systems management program or cause data to be lost. Finally, those operating computing systems often rely on those computing systems continuing to operate and perform with certain characteristics without fail over relatively long periods of time, for instance over months or years. Relatively short deviations in performance or operation are therefore of interest to such users, but many existing systems management programs either do not monitor data indicative of performance with sufficient granularity or do not monitor data indicative of performance with frequency speed to inform users of events briefly affecting performance.

BRIEF DESCRIPTION OF THE DRAWINGS

The aspects of the present techniques will be better understood when the application is read in view of the following figures in which like numbers indicate similar or identical elements.

Figure 1:
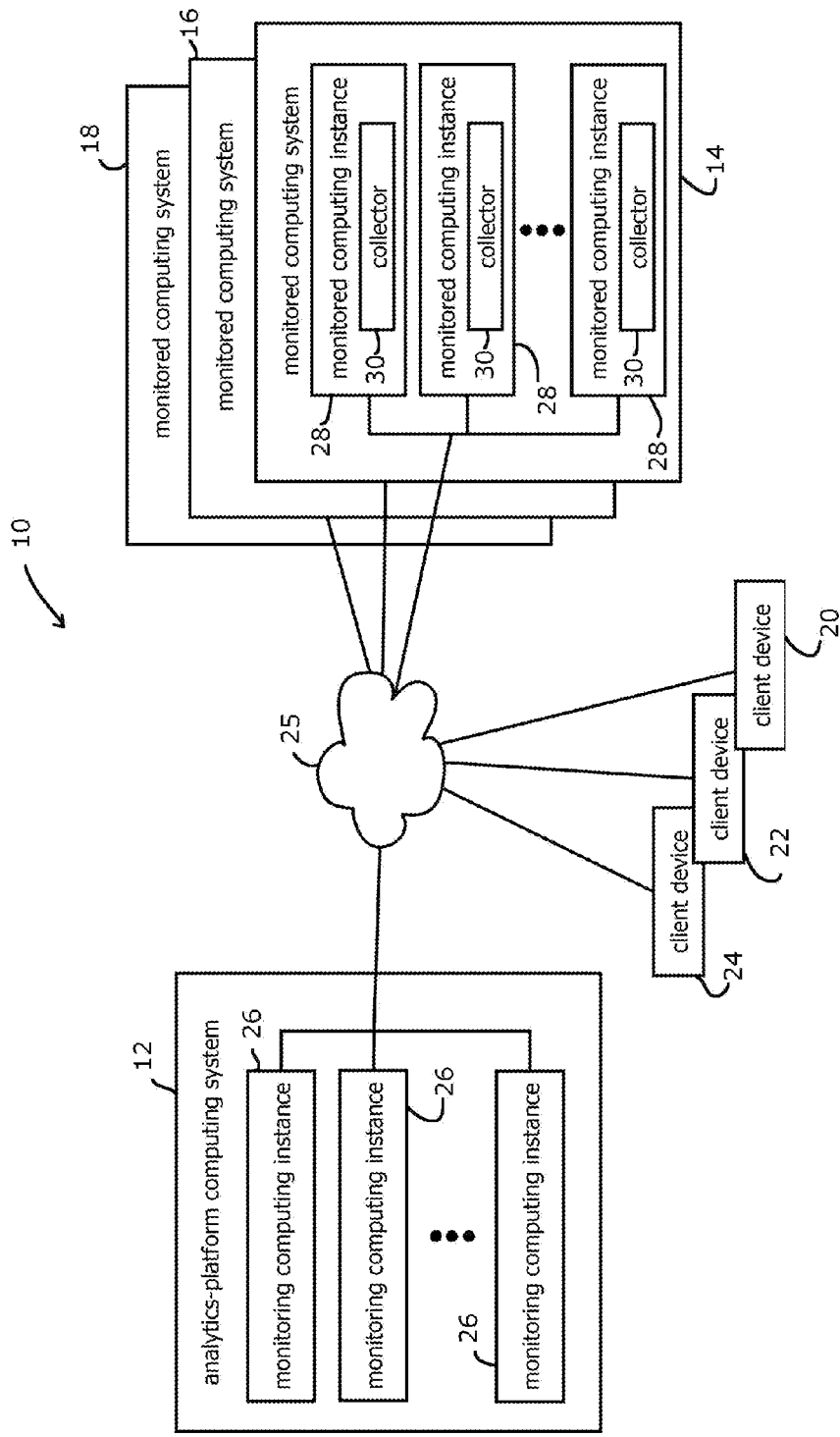
FIG. 1 shows an embodiment of an analytics-platform computing system for monitoring a plurality of monitored computing systems.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention, e.g., as defined by the appended claims.

DETAILED DESCRIPTION OF CERTAIN EMBODIMENTS

FIG. 1 shows an embodiment of an analytics-platform computing system that may address some or all of the deficiencies described above. In certain embodiments, as described below, the analytics-platform computing system 12 may be configured to output results within less than (or substantially less than, e.g., in real time) approximately 120 seconds of when the events upon which the results are based occur, e.g., an even occurring on a monitored computing instance. Further, some embodiments may be capable of monitoring a plurality of different computing systems, each associated with a different account, for example on behalf of a plurality of different entities having accounts, such that monitoring is provided as a service to account holders who are relieved of the burden of hosting a computer system management program. Some embodiments, as described below, may also be relatively easy to configure to monitor new computing instances added to a monitored computing system because, in some instances, the new computing instances may initiate a monitoring session with the analytics platform and push data to the analytics platform, without the analytics platform being pre-configured to communicate with each specific new computing instance. Additionally, in some embodiments described below, the analytics-platform computing system 12 may be a scalable computing system operable to provision additional monitoring computing instances 26 or other additional computing resources based upon need, thereby potentially reducing the hardware costs associated with the system. Not all embodiments, however, provide all of these benefits, as various trade-offs may be made using the techniques described herein in pursuit of other objectives, and some embodiments may provide other benefits, some of which are described below.

In the embodiment of FIG. 1, a computing environment 10 includes the analytics-platform computing system 12; a plurality of monitored computing systems 14, 16, and 18; a plurality of client devices 20, 22, and 24; and a network 25. The illustrated analytics-platform computing system 12 includes a plurality of monitoring computing instances 26 which may serve a variety of different functions, examples of which are described below with reference to FIG. 7, and the number of which may be variable based on the computing load placed on the analytics-platform computing system 12, as described below with reference to FIG. 11.

In some embodiments, the analytics-platform computing system 12 is a computing system having a plurality of monitoring computing instances 26, each of which may be a different physical computing device operating an operating system on one or more processors connected to memory, for example operating in a single memory address space. Or the monitoring computing instances 26 may be virtual machines, e.g., virtual machines executed by a virtualization host, and several virtual machines may be hosted on a single physical computing device, or some instances may host a single virtual machine on multiple physical computing devices. In either case, the computing devices may be one of the examples of computing devices described below with reference to FIG. 13, such as laptops, desktops, or rack-mounted computing devices, for example. Each monitoring computing instance 26 may have an operating system upon which an application may be loaded and within which the application may be executed, and in some embodiments, some monitoring computing instances 26 may include one or more physical and virtual machines.

In certain embodiments, the analytics platform computing system 12 may be embodied as a cloud-based distributed application, such as an application deployed in a public cloud (e.g., the elastic compute cloud service offered by Amazon. com, Inc. of Seattle, Wash.), or in a private cloud operated as a virtualized infrastructure within an enterprise data center (for instance, based on the open-source KVM hypervisor). Some embodiments of the cloud-based analytics-platform computing system 12 may scale (e.g., by adding or subtracting monitoring computing instances 26) based on the computing load of the analytics-platform computing system 12. For example, scaling may be performed automatically based solely on the computing load or based on the computing load and other factors, such as the cost of marginal computing instances, bandwidth, or other resources, or scaling may be performed based solely (or partially) on one of these other factors, independent of load, or a combination thereof, e.g., a subset. An analytics-platform computing system that is configured to scale based on load is expected to accommodate a variable number of monitored computing systems and monitored computing systems of variable size without incurring the cost of provisioning computing resources for the maximum expected load. Examples of such scaling are described below with reference to FIG. 7. In other embodiments, the analytics platform computing system 12 does not scale, does not scale automatically, or is not cloud-based and may be executed by a single computing device, which is not to suggest that any other feature described herein may not also be omitted in some embodiments.

The analytics-platform computing system 12, in some embodiments, may be operable to monitor or manage computing systems 14, 16, and 18 for multiple users associated with client devices 20, 22, and 24 and the computing systems 14, 16, and 18, thereby providing computer system management software as a service (e.g., a subscription service). As explained in greater detail below, some embodiments may be capable of associating each of the different monitored computing systems 14, 16, and 18 with a different account, and in some embodiments, users associated with those accounts may monitor the corresponding one of the computing systems 14, 16, and 18 via one of the client devices 20, 22, or 24. In some embodiments described below, the client devices 20, 22, and 24 include a web browser (e.g., a laptop, desktop, smart phone, or remote virtual machine having a browser), and the analytics-platform computing system 12 is operable to serve a web-based interface to users via the web browser. Advantageously, some embodiments may provide a computing system management service to each of a plurality of different users, each monitoring one of a plurality of different computing systems, thereby potentially reducing or eliminating the need of such users to host or maintain their own computing system management program. Some embodiments, however, may have one analytics-platform computing system for each monitored computing system, and both systems may be operated by the same entity, which is not to suggest that any other feature described herein may not also be omitted in some embodiments.

The monitored computing systems 14, 16, and 18 may each be a different monitored computing system associated with, and under the control of, a different entity, for example a different account of a cloud computing service, a different operator of a data center, or a different user of the analytics-platform computing system 12. In some embodiments, some or all of the monitored computing systems 14, 16, and 18 may be executed on the same cloud computing service or data center that executes the analytics-platform computing system 12 or on different systems. Some embodiments of the monitored computing systems 14, 16, and 18 may be hosted on examples of the above-mentioned public cloud, examples of the above-mentioned private cloud, examples of the above-mentioned data centers, or some combination thereof. In some instances, some or all of the computing systems 14, 16, or 18 may be executed on a virtualized infrastructure, such as a virtualized infrastructure executed within an enterprise data center. In some embodiments, one or more of the monitored computing systems may be characterized as a cluster computing system. Some embodiments may be operated on host devices under the control of a single entity, or under the control of multiple entities, e.g., a volunteer distributed computing project.

In some embodiments, the computing systems 14, 16, and 18 may be executed, partially or substantially entirely, on a public cloud computing service. The cloud computing service may have certain attributes. For example, the physical infrastructure upon which computing instances are built may be not visible to users of the cloud computing service. The cloud service provider may obscure from, or abstract away from, users details of the physical computing devices upon which the computing instances are hosted. Further, in some instances, users of the cloud computing service may have service-level agreements with the provider of the cloud computing system that specify minimum performance and uptime characteristics, and as described below, some embodiments of the analytics-platform computing system 12 may be capable of verifying whether these service-level agreements are met.

The computing systems 12, 14, 16, and 18, in some embodiments, may each include a plurality of computing instances, such as the monitoring computing instances 26 of the analytics-platform computing system 12 or the monitored computing instances 28 of each of the monitored computing systems 14, 16, and 18. The computing instances 26 and 28 in each of these examples may be a physical computing device or may be a virtual machine, either of which may execute an operating system and one or more applications performing certain tasks. The computing instances are not necessarily physical computers, and in some embodiments, attributes and configurations of the physical computers upon which the computing instances are executed may be obscured to those using the computing instances and controlling the execution of the applications. The applications may be executing any of a wide variety of different tasks. For example, some applications may be executing a data analysis algorithm, a database, a Web server, or any of a variety of other tasks.

In the course of executing these applications, the number of computing instances may change. For example, some cloud computing systems are operable to increase or decrease the number of computing instances based on the computing load, for example based on the amount of data to be processed by the above-mentioned applications or the speed of such processing, which in some use cases correlates with the number of users interacting with the services provided by the monitored computing systems 14, 16, and 18. As described in greater detail below, the analytics-platform computing system 12 may be capable of tracking newly added computing instances as those newly added computing instances identify themselves to the analytics-platform computing system 12.

Further, as the monitored computing systems 14, 16, and 18 execute their applications, attributes of the monitored computing instances may vary. Examples of such attributes include the amount of memory allocated to, or possessed by, each computing instance in use, the amount of processing power of each computing instance in use (e.g., the percentage of time that a CPU is generally idle), attributes of network usage (e.g., input bandwidth use, output bandwidth use, or input or output bandwidth use of certain types of traffic—for instance based on packet headers, latency, packet loss, and the like), economic attributes (e.g., the cost of instances, the cost of CPU cycles, the cost of memory, or the cost of network traffic), and sensed physical properties of the underlying computing device, such as temperature and vibrations. As explained in greater detail below, some or all of these attributes or similar attributes may be monitored by the analytics-platform computing system 12 such that a user operating one of the client devices 20, 22, or 24 can view information about such attributes of a computing system 14, 16, or 18 under that user's control. (In some embodiments, one or more of the client devices 20, 22, or 24 may be one of the monitored computing instances 28, e.g., a virtual machine operating a web browser by which performance of that computing instance 28 and other computing instances 28 is displayed.)

In some embodiments, some, all, or substantially all of the computing instances 28 of a monitored computing system 14, 16, or 18 may execute a collector 30. As described in greater detail below with reference to FIG. 2, the collectors may be capable of introducing new computing instances to be monitored to the analytics-platform computing system 12 and initiating a monitoring session with the analytics-platform computing system 12 to monitor the new computing instance. Further, as described in greater detail below with reference to FIGS. 5 and 6, the collectors 30 may be capable of bundling, compressing, encrypting, buffering, and then pushing gathered data to the analytics-platform computing system 12 in a manner that is relatively robust to interruptions in network connections between the collector 30 and the analytics-platform computing system 12 and bursts of traffic over such connections. The collectors 30 may be executed within the operating system of each of the monitored computing instances 28, for example as a parallel thread or process to those threads or processes executing the above-described applications for each of the monitored computing systems 14, 16, and 18.

In some embodiments, each monitored computing system 14, 16, and 18 may perform a process for adding a new computing instance to the monitored computing system, for example based on a load of the monitored computing system, for instance in response to the load exceeding a threshold, in response to a response time of some or all of the monitored computing system exceeding a threshold, or in response to one or more attributes of monitored computing instances exceeding some threshold or obtaining some state. When adding a monitored computing instance, in some embodiments, a monitored computing system may request a new computing instance from a cloud computing system provider or other resource for computing instances and transmit, or request that such a transmission be performed, to the new computing instance a machine image including an operating system and one or more applications to be executed within the operating system, including the collector 30. Upon booting of this image on the new computing instance to be monitored, as described in greater detail below with reference to FIG. 3, the collector 30 may initiate communication with the analytics-platform computing system 12, identify the new computing instance to the analytics-platform computing system 12, and then push data about the operation of the new computing instance to the analytics platform computing system 12.

The illustrated embodiment includes three monitored computing systems 14, 16, and 18, but other embodiments may include fewer or substantially more. In some embodiments, each monitored computing system 14, 16, and 18 may be associated with an account, such as a subscription account, identified in memory accessible to the analytics-platform computing system 12. In some embodiments one (or one and only one) account may be associated with each monitored computing system by the analytics-platform computing system 12. In other embodiments, one account may be associated with one or more monitored computing systems, and each such monitored computing system may be associated with a system identifier also associated with the account that distinguishes among the various monitored computing systems of the account. As explained in greater detail below with reference to FIG. 10, users associated with such accounts may receive data indicative of the operation of corresponding monitored computing systems through one of the client devices 20, 22, and 24 by identifying the account to the analytics-platform computing system 12, for instance by entering an account identifier and a password in a web user interface.

The client devices 20, 22, and 24 may be a variety of different types of computing devices, including the above-described computing instances, and the devices described below with reference to FIG. 13, such as personal computers, laptops, smart phones, or other devices having a user interface capable of presenting data about the operation of a monitored computing system. In some embodiments, some or all of the client devices 20, 22, and 24 may not have such a interface, for example some of the client devices 20, 22, and 24 may be a server or other computing device capable of controlling one of the monitored computing systems 14, 16, or 18 based on data from the analytics-platform computing system 12. For instance, the client devices 20, 22, or 24 may add computing instances to a monitored computing system based on data indicating a load on the monitored computing system has increased, has increased above a threshold, has increased at a rate such that the rate exceeds a threshold, or data indicating a response time of a monitored computing system has increased or increased above a threshold. Similarly, such embodiments may terminate computing instances from a monitored computing system upon a decrease in such factors, e.g., a decrease below similar thresholds.

The network 25 may include a variety of different types of networks, either individually or in combination. In some embodiments, the network 25 may include the Internet. In another example, the network 25 may include a wide area network or a local area network, such as an Ethernet. The network 25 may span a relatively large geographic area, in some embodiments. For example, the analytic-platform computing system 12 may be remote from the monitored computing systems 14, 16, and 18, which may be each remote from one another, and the systems 12, 14, 16, and 18 may all be remote from the client devices 20, 22, and 24, which each may also be remote from one another, for example these components may be further than 10 miles apart, further than 100 miles apart, or further than 500 miles apart.

Like the other features and embodiments of other figures described herein, embodiments are not limited to systems having the same number of features as those illustrated in FIG. 1. For example, other embodiments may include multiple analytics-platform computing systems 12, a single or many more monitoring computing instances 26, a single or many more monitored computing systems 14, 16, and 18, a single or many more monitored computing instances 28 within each of the monitored computing systems 14, 16, and 18, more than one collector 30 within each monitored computing instance 28, and zero, one, or many more than one client devices 20, 22, and 24 each associated with one of the monitored computing system 14, 16, and 18. This is not to suggest that any other embodiment described herein is limited to the exact number of features illustrated in a figure.

Figure 2:
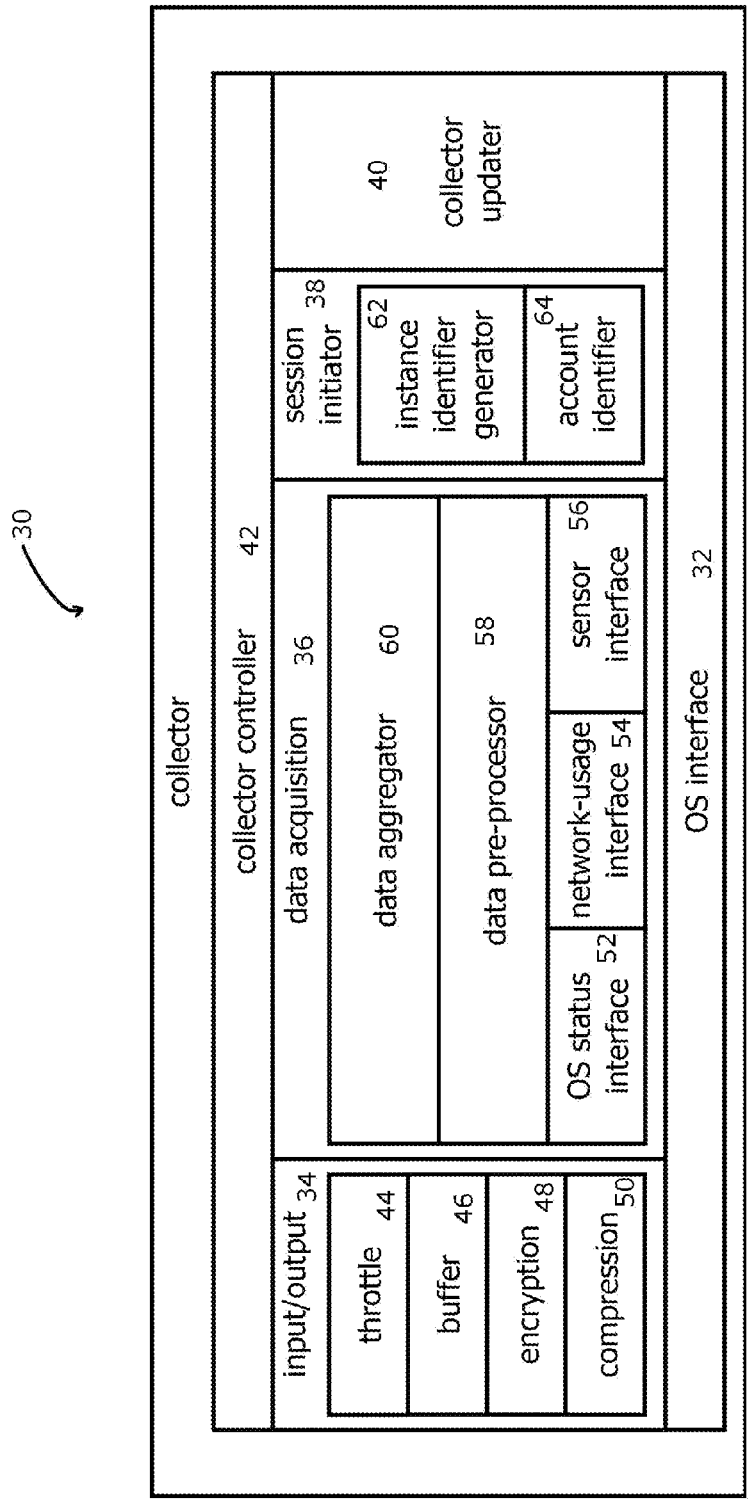
FIG. 2 shows an embodiment of a collector executed on computing instances of monitored computing systems of FIG. 1.

FIG. 2 illustrates an embodiment of the collector 30 described above with reference to FIG. 1. The same collector 30 may be executed in each of the above-described monitored computing instances 28, or in some embodiments, different collectors may be configured for different computing instances 28. The collector 30 may be operated in combination with the other components described above with reference to FIG. 1, or the collector 30 may be used to collect data in other computer systems, such as networking systems or storage systems, for other computer system management programs.

As described in greater detail below, in some embodiments, the collector 30 may be capable of identifying a new computing instance to the analytics-platform computing system 12, which may lower labor costs and reduce response time associated with configuring the analytics-platform computing system 12 to monitor a new computing instance relative to systems in which the analytics-platform computing system 12 initiates communication or polls data from the computing instance. Further, as is also described in greater detail below, the collector 30 may be capable of compressing gathered data in a manner that tends to reduce overhead associated with transmission of the data to the analytics-platform computing system 12. Embodiments of collectors 30 are also capable of buffering and modulating the transmission of the gathered data such that data is retained in the event of a network failure, or failure of any other component existing in-between the collector and functioning monitoring computing instance 26 including a component or process of the analytics-platform itself, and such that surges in the transmission of data are mitigated following recovery of the network 25 after such a failure. The collector 30 may also be capable of receiving updates of collector software from the analytics-platform computing system 12, thereby potentially lowering the burden on users of monitored computing systems desiring to keep collector software up-to-date.

In some embodiments, the collector 30 includes an operating system interface 32, an input/output module 34, a data acquisition module 36, a session initiator module 38, a collector updater module 40, and a collector controller module 42. These modules are described and depicted as separate functional blocks; however hardware or software implementing the corresponding functions may be intermingled, conjoined, separated, or otherwise organized relative to the functional blocks described herein.

The collector 30, in some embodiments, may be capable of collecting or measuring performance, configuration, and resource utilization data (referred to as metrics) from the operating system executing on the monitored computing instance via the operating system interface 32. The metrics may be gathered by the data acquisition module 36 and may be referred to as metrics of the monitored computing instance. The metrics may be indicative of performance, resource utilization, component hardware and software component identities and versions, costs of use, and other attributes. The resulting metric data, in some embodiments, may be pre-processed by the input/output module 34 by packaging the data into time-based buckets or other batches aggregated according to other criteria, for example based on a predetermined quantum of data, thereby potentially reducing the amount of data to be transmitted to the analytics-platform computing system 12 and reducing operating costs and network usage. Other embodiments, however, may not pre-process the data, which is not to suggest that any other feature described herein may not also be omitted in some embodiments. In this embodiment, the operating system interface 32 may be capable of making calls to an application programming interface of the operating system of the monitored computing instance, for example in response to requests for data or commands from the other components of the collector 30.

In some embodiments, the input/output module 34 is capable of communicating with the other components of the collector 30 and with the analytics-platform computing system 12 via the network 25 (FIG. 1). As illustrated by FIG. 2, this embodiment of an input/output module 34 includes a throttle module 44, a buffer module 46, an encryption module 48, and a compression module 50. Other embodiments may include additional modules or fewer modules, again which is not to suggest that other features may not also be omitted.

FIG. 2 illustrates some of these modules as being spatially interspersed between other modules, but FIG. 2 is not limited to a particular topology, and the components of FIG. 2, as is the case with the other block diagrams herein, may communicate with one another, in some use cases and some embodiments bi-directionally, either directly or indirectly through other modules or components. Such communication may occur through a variety of techniques at a variety of different layers of abstraction, including via a wired or wireless network, via a bus within a computing device, by way of calling module or component application program interfaces (APIs), or via reference to value stored in memory, such as values associated with variables within a program, or via copies of such values passed between processes or sub-programs.

The input/output module 34 and its components 44, 46, 48, and 50 may be operable to execute portions of the processes described below with reference to FIG. 3 and FIG. 4 and the processes described below with reference to FIG. 5 and FIG. 6, in some embodiments. As explained in greater detail below with reference to these figures, the throttle module 44 may be capable of throttling the output of the collector 30 to the analytics platform computing system 12 such that sudden spikes in network traffic to the analytics-platform computing system 12, for instance following a systemic failure or recovery from a network failure, are mitigated, thereby potentially reducing the likelihood of a spike in traffic from one monitored computing system impeding the flow of data from another monitored computing system. The buffer module 46 may be capable of storing (e.g., buffering) metrics such that data losses are avoided or mitigated when the throttle module 44 (or a network outage) causes the input/output module 34 to transmit data at a slower rate than the collector 30 is gathering data. The encryption module 48 may be operative to encrypt data from the collector 30, such that an entity monitoring network traffic, for example an entity performing deep packet inspection of traffic to the analytics-platform computing system 12, may be impeded from inferring details about the operation of a monitored computing system 14, thereby potentially satisfying some regulatory requirements for the security of data relating to certain systems and potentially limiting the likelihood of certain types of attacks on system security, such as attacks based on changes in resource usage in response to more or fewer characters of a password being correct. The compression module 50 of this embodiment may be operative to reduce the amount of network traffic used to convey a given amount of information from the collector 30 to the analytics-platform computing system 12. Examples of compression are described below with reference to FIG. 5.

In this embodiment, the data acquisition module 36 includes an operating system status interface module 52, a network-usage interface module 54, a sensor interface module 56, a data pre-processor module 58, and a data aggregator module 60. Other embodiments may include additional modules or fewer modules, again which is not suggest that other features may not also be omitted or supplemented.

In some embodiments, the operating system status interface module 52, the network usage interface module 54, and the sensor interface module 56 may be capable of gathering metrics about the monitored computing instance. For example, the operating system status interface module 52 may be capable of commanding the operating system, via the operating system interface 32, to return data indicative of resource utilization, configuration, and performance of the operating system, resources of the operating system, or software executed in the operating system, including resource utilization and performance of applications and other processes. Examples of such metrics include utilization of system memory, for instance utilization of random-access memory, utilization of various other types of memory, such as cache memory, persistent storage memory (e.g., hard disk drive memory, solid-state drive memory, and the like), graphics memory, and other forms of special-purpose memory, such as buffer memory in a network interface card. In another example, the metrics may include utilization of various types of processors, such as utilization of one or more cores of a central processing unit, and utilization of a graphics processing unit, for example. Utilization may be expressed in a variety of formats, for example a percentage of a capacity (such as in comparison to historic averages, peaks and troughs where the historic data was previously recorded by the analytics platform computing system, in comparison to historic data gathered from a wide variety of time and date ranges, in comparison to aggregate historic data previously gathered from similar or different instances, running in the same or different cloud/data center/virtual infrastructure), an absolute amount of utilization, for instance in megabytes or cycles of a CPU, or a binary indicator of whether some condition has been obtained or not been obtained. Metrics may include data logged by the operating system, including error conditions, and data indicative of which processes are running. Metrics may also include performance metrics, for example data indicative of the amount of time various tasks take, such as the time taken to retrieve data from memory or write data to memory, or time taken to perform certain processing tasks, such as the time taken to iterate a portion of an application or time taken to yield some results. Other metrics may include metrics that are application or process specific, such as the above-described metrics that are attributable to a given process or application, and a list of such processes or applications. Some embodiments may be capable of obtaining metrics indicative of the configuration of the monitored computing instance, for example a size of a memory space of the monitored computing instance, for instance whether the monitored computing instance is a 32-bit or 64-bit system, system information about allocated or present processing power and memory, and the like. Gathered data may also include data indicative of versions of applications, drivers, and firmware. Metrics may also include cost data associated with the operation of the computing instance, for instance cost data associated with electrical power, cost data of units of processing, costs data of units of memory, and cost data of network transmissions or reception of data.

In some embodiments, the network-usage interface module 54 may be capable of obtaining information relating to network usage via the operating system interface 32 by transmitting commands to the operating system interface 32 and receiving data retrieved via the operating system interface 32. Examples of network usage data include data indicative of a rate or amount of network traffic received by or transmitted by the monitored computing instance and data indicative of performance of network traffic, such as packet loss, latency, bandwidth, routes, and data indicative of recipients of network traffic or transmitters of network traffic to the monitored computing instance. The data indicative of network traffic may also include data that is specific to particular types of network traffic, for example network traffic encoded according to particular protocols, data particular to certain applications, data particular to network traffic received through or transmitted through a particular port, and data indicative of network traffic received from or transmitted to some other computing device. The data indicative of network traffic may also include data indicative of the operation of a network interface card, physical or virtual, such as data indicative of an amount of data stored in a buffer of the network interface card and data indicative of the capabilities of the network interface card, such as supported protocols, an amount of memory, supported features, and firmware versions. In some embodiments, the network usage interface module 54 is also operable to gather data indicative of information encoded in network traffic, such as data available through deep packet inspection of network traffic, from which can be derived transaction information including transaction response times, for example the response times for various application or storage protocol transactions.

In some embodiments, the sensor interface module 56 is operable to obtain data from various sensors of the computing device providing the monitored computing instance by transmitting requests for such data to the operating system interface 32 and receiving results retrieved by the operating system interface 32 from sensors. Examples of such data include temperature data indicative of the temperature of various components of the physical computer provided by the monitored computing instance, such as the temperature of a processor (e.g. a central processing unit, a digital signal processor, a graphics processing unit, a memory controller, a hard disk drive controller, and the like), the temperature of memory (e.g., random-access memory, cache memory, or a hard disk drive memory, such as a solid-state drive), the temperature of a power supply, or (i.e., and/or) the ambient temperature within a case or rack in which the monitored computing instance is disposed. Other examples of sensor data may include audio data or motion sensor data indicative of vibration of components of the physical computer providing the monitored computing instance (e.g., capacitor or fan vibrations) or a current draw or a voltage of various components, such as fans, processors, memory, or a power supply. In some embodiments, obtaining sensor data may include accessing some form of clock chip or other component that provides, or can be made to provide signals or indications on a regular basis, either absolutely or relative to the 'virtual clock' of virtual machines.

The metrics gathered by the interface modules 52, 54, and 56 may be processed by the data pre-processor module 58, in some embodiments. In embodiments having a data pre-processor module 58, this module may perform certain analyses on the gathered data to identify certain metrics that are discernible within the subsequently described batches of data formed by the data aggregator 60. For instance, the data pre-processor 58 may be capable of identifying within data associated with these batches a maximum value, a minimum value, an average value, a median value, a standard deviation, a variance, a count of some events, and the like. The data pre-processor 58 may also be capable of reducing the granularity of metrics, for example by sampling the data obtained by the module 52, 54, and 56.

The data aggregator module 60, in this embodiment, may be capable of receiving metrics from the data pre-processor 58 or directly from the interfaces 52, 54, and 56 and packaging the metrics in batches. The batches may be defined based on time, for example data arriving within a duration, such as a predetermined or dynamically determined duration of time that remains constant (e.g., a period) or varies during the operation of the collector 30. In another example, the batches may be defined based on an amount of data, for example each batch may contain a predefined or dynamically determined amount of data, such as one kilobyte, 10 kilobytes, or 1 megabyte, for instance. In another example, the batches may be defined based on the occurrence of events, for example a batch may begin when a process executed by the monitored computing instance starts and end when the process ends. Batching the data is expected to reduce the amount of data transmitted to the analytics-platform computing system 12 while still providing data indicative of the operation of the monitored computing instance over the batching duration. In some embodiments, the batches may be relatively small in order to provide a relatively high resolution view of the operation of the monitored computing instance, for example the batches may span an amount of time less than or approximately equal to 30 seconds, 20 seconds, 10 seconds, 5 seconds, one second, or 100 microseconds or less. Other embodiments, however, may not batch data, and some or all of the gathered data may be transmitted to the analytics platform computing system 12, which is not to suggest that any other feature described herein may not also be omitted in some embodiments.

In some embodiments, the data aggregator module 60 may include an input, a buffer, a batch manager, and an output. The input may receive data from the data pre-processor module 58 and store the data in the buffer. The batch manager may determine when a batch is complete and, in response, instruct the output to transmit the batch to the input/output module 34 and clear the buffer.

As noted above, the controller 30 may also include the session initiator module 38, in some embodiments, which may include an instance identifier generator 62 and an account identifier module 64. Details of the operation of the session initiator module 38 are described in greater detail below with reference to FIG. 3. The session initiator module 38 may be capable of requesting identifiers from these modules 62 and 64 and initiating a monitoring session with the analytics-platform computing system 12.

In some embodiments, the session initiator 38 is capable of initiating communication with the analytics-platform computing system 12, without the analytics-platform computing system 12 first communicating with the collector 30 or the new monitored computing instance. In some embodiments, the session initiator 38 is capable of alerting the analytics-platform computing system 12 to the existence of a new computing instance to be monitored without the analytics-platform computing system 12 otherwise receiving instructions indicating the existence. The session initiator 38 may be characterized as being capable of self identifying the collector 30 or the monitored computing instance to the analytics-platform computing system 12. The session initiator module 38 is expected to simplify the burden associated with configuring an analytics-platform computing system 12 to monitor a computing system by automatically informing the analytics-platform computing system 12 of which computing instances are to be monitored. However, other embodiments may not include a session initiator module 38, and some embodiments may include an analytics-platform computing system 12 that is configured to identify a new monitored computing instance based on signals received from some other source, for example signals received from one of client devices 20, 22, or 24 or one of the other monitored computing instances 28 tasked with requesting a new computing instances from a cloud service provider, which again is not to suggest that any other feature herein is required in all instances.

The instance identifier generator module 62 may be capable of forming an identifier, such as an identification number, code, or other string, that is unique to (or likely to be unique to, for example more likely than one in 100,000) each monitored computing instance within a monitored computing system or each monitored computing instance. Further, in some embodiments, the instance identifier generator module 62 is capable of forming such an identifier without receiving information from the analytics-platform computing system 12, for example prior to initiating contact with the analytics-platform computing system 12. The instance identifier may be formed based on a variety of attributes of the monitored computing instance, for example some operating systems alone, or by way of interaction with another component may provide a unique identifier which may be used, a network address of the monitored computing instance, a MAC address of the monitored computing instance, serial numbers of components of the monitored computing instance, or attributes likely to vary, such as a pseudorandom number generated by the monitored computing instance, less significant digits of a temperature of the monitored computing instance, and less significant digits of a voltage measured by the monitored computing instance. In some embodiments, these values may be inputs to a hash function that generates the instance identifier.

Drawing on these sources of values that are likely to vary among the monitored computing instances is expected to yield instance identifiers that are likely to be unique among the monitored computing instances, thereby potentially providing an identifier with which the collector 30 may initiate a session with the analytics-platform computing system 12 without the analytics-platform computing system 12 centrally coordinating the allocation of instance identifiers, and potentially relieving users of the burden of configuring the analytics-platform computing system 12 for such central coordination. In other embodiments, however, the instance identifier may be received from some other source, for example from a client device 20, 22, or 24 or another computing instance coordinating the operation of other computing instances or from the analytics-platform computing system 12, which is not to suggest that other features cannot also be omitted in some embodiments.

Similarly, the account identifier module 64 may obtain an identifier that is unique to (or likely to be unique to) an account associated with the monitored computing system of the monitored computing instance. The account identifier, in some embodiments, may be obtained from a computing instance controlling the instantiation and termination of new computing instances of a monitored computing system, for example. Other embodiments may not include an account identifier, for instance, some embodiments may include an identifier for a monitored computing system that is not associated with an account.

The session initiator module 38 may also include an address of the analytics-platform computing system 12, for example an address reachable through the network 25 (FIG. 1). The address may take a variety of forms, for example the address may be an Internet protocol address, such as an Internet protocol version 4 or version 6 address, or the address may be a uniform resource identifier associated with the network address of the analytics-platform computing system 12 and resolvable through a domain name service. The session initiator 38 may also be operative to establish a secure connection with the analytics-platform computing system 12, for example by exchanging encryption keys.

The collector updater module 40 may be capable of determining the version or configuration of the collector 30, requesting data indicative of newer versions or a newest version of a collector from the analytics-platform computing system 12, determining based on this data whether to upgrade the collector 30, requesting data encoding instructions for a new collector corresponding to the newer version or newest version from the analytics-platform computing system 12, and launching a module configured to uninstall the old version of the collector 30 and install the new version or newer version. In some embodiments the determination to upgrade may be made at the analytics-platform computing system 12 or in some other computing system or device.

The updater module 40 may, in some embodiments, receive a signal from the session initiator module 38 indicating that a new monitoring session has been established with the analytics-platform computing system 12, and in response, the collector updater 40 may perform the steps described above to determine whether to upgrade. In some embodiments, the collector updater module 40 may perform a similar determination repeatedly during the operation of the collector 30, for example upon the hour, once a day, once a week, or once a month. The collector updater module 40 may be capable of updating the collector 30 to a new version during the operation of a monitored computing instance without losing data measured by the monitored computing instance, or with losing relatively little data monitored by the collector 30. For example, the collector updater 40 may be capable of installing a new collector embodying the new version while the collector 30 continue to operate, determining that the new collector is operative and has established a monitoring session, instructing the older version of the collector 30 to stop gathering data, determining that the remaining data stored in the buffers of the older version of the collector 30 have been transmitted, and then terminating the older version of the collector 30.

The collector controller 42 may be capable of coordinating the operation of the components of the input-output module 34, the data acquisition module 36, the session initiator module 38, the collector updater module 40, and the operating system interface module 32. For example, the collector controller 42 may instantiate and terminate each of these modules 34, 36, 38, 40, and 32, and in some embodiments, these modules may bi-directionally communicate with one another via the collector controller module 42, for instance by passing values by reference or as copies of values as parameters returned to the collector controller 42, which may then pass these values or references to other modules. In some embodiments, the collector controller 42 may be executed in response to a new computing instance booting or a new version of the collector 30 being installed, and upon (in response to) being executed, the collector controller module 42 may launch the session initiator module 38 to establish a monitoring session with the analytics-platform computing system 12, then launch the update module 40 to determine whether the collector 30 is the correct version, then upon determining that the collector 30 is the correct version, launch the data acquisition module 36 and the input/output module 34 to begin gathering and reporting data to the analytics-platform computing system 12.

The collector 30, in some embodiments, is expected to automatically reconfigure the analytics-platform computing system 12 to monitor new computing instances as new computing instances are added to a monitored computing system and automatically update the collector as new versions are promulgated. These techniques, either individually or in isolation, are expected to reduce the burden on those attempting to monitor computing systems, particularly those attempting to monitor scalable computing systems formed within a cloud computing service that supports automatic provisioning of additional computing resources based on load or other needs. These techniques may be prohibited in specific use cases for a variety of reasons, such as security concerns. The collector 30 in some embodiments may have the automated reconfiguration and automated update capabilities permanently disabled. In such embodiments, reconfiguration and collector updates may be carried out by manual intervention. Other embodiments, however, may not necessarily provide these advantages, and various engineering trade-offs may be made to use the techniques described herein to obtain other objectives.

Figure 3:
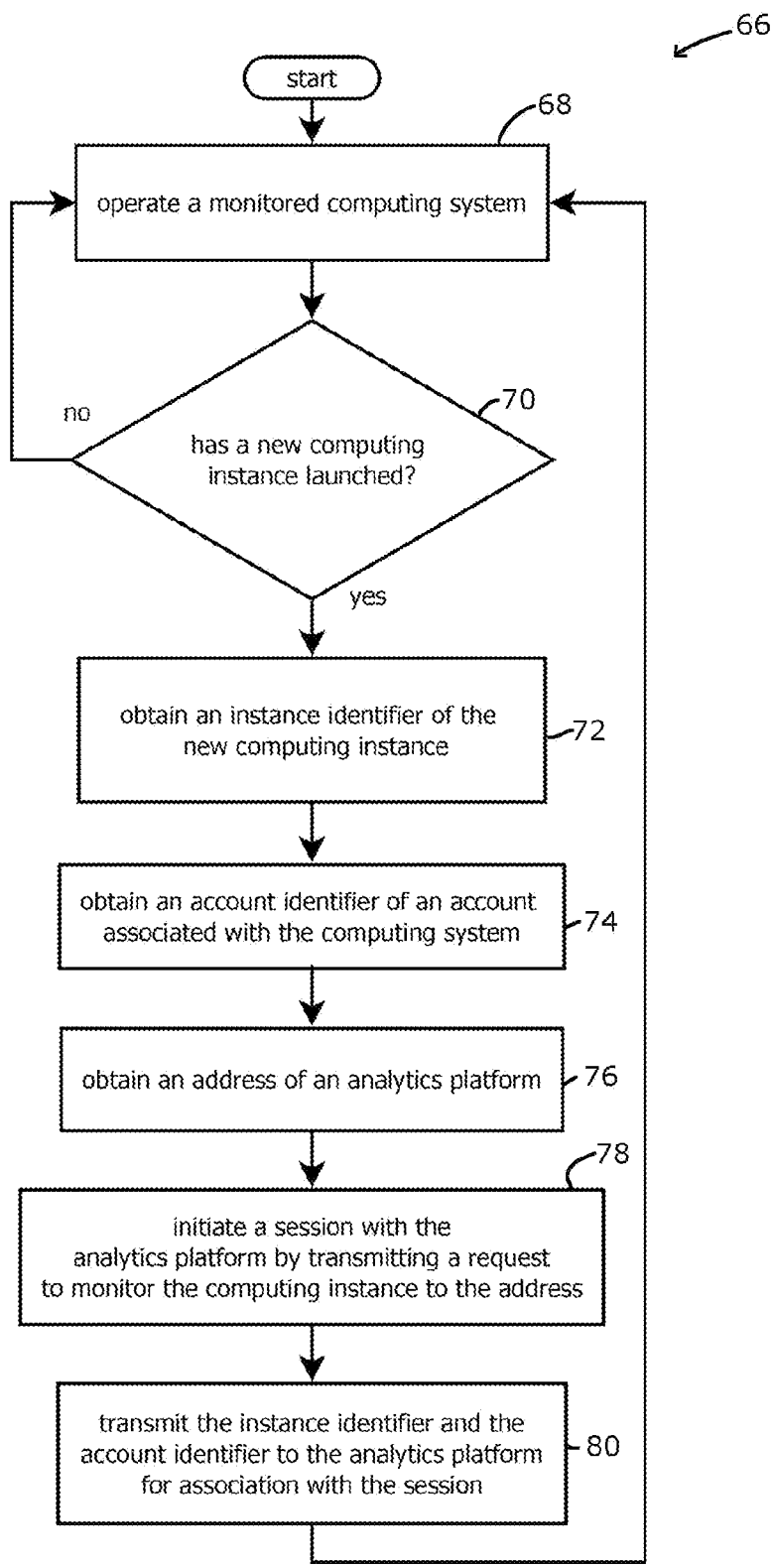
FIG. 3 shows an embodiment of a process for initiating a monitoring session with an analytics platform from a computing instance to be monitored.

FIG. 3 illustrates an embodiment of a process 66 for initiating a monitoring session, for instance with the analytics-platform computing system 12, upon the launch of a new computing instance. Some, all, or substantially all of the process 66 may be performed by the session initiator module 38, for instance in cooperation with the other components of the collector 30 of FIGS. 1 and 2. Applications of the process 66, however, are not limited to these configurations.

The process 66 begins with operating a monitored computing system, as indicated by block 68. Operating a monitored computing system may include operating one or more monitored computing instances of the monitored computing system. In some embodiments, the instances may be formed by uploading from a main instance, or a controlling client device, a machine image including an operating system, the above-described collector, and applications to be executed by the instance to perform the tasks that the computing system is intended to perform for a user. New instances may be obtained, in some embodiments, by transmitting a request for a new instance to a cloud service provider or other system for dynamically allocating computing resources, such as an elastic data center or virtualized computing infrastructure provider. The request may include specifications of the requested computing instance, for example an amount of addressable memory supported, processor specifications such as 32 bits or 64 bits, memory specifications and the like. Some requests may also specify an operating system.

Next, in some embodiments, the process 66 includes determining whether a new computing instance has launched, as indicated by block 70. In some embodiments, this and the subsequent steps may be performed by the collector 30, which may be launched upon the boot of the new computing instance, thereby determining that the new computing instance has launched. In other embodiments, software or hardware external to the new computing instance may determine that a new computing instance has launched. For example, a computing device that requests the launch of the new computing instance may make this determination upon having made the request or upon having received confirmation that the request was satisfied. Upon determining that a new computing instance has not launched, in response, the process 66 may return to block 68. Alternatively, upon determining that a new computing instance has launched, in response, the process 66 may proceed to the next step described.

Next, in some embodiments of process 66, an instance identifier of the new computing instance may be obtained, as indicated by block 72. Obtaining an instance identifier may be performed with the instance identifier generator module 62 described above with reference to FIG. 2. In some embodiments, the instance identifier may be a number, code, or other string that is unique or likely to be unique to the new computing instance, and in some embodiments, the new instance identifier may be obtained based on attributes of the new computing instance, such that the instance identifier is formed without central coordination from, for example, an analytics platform.

Next, in some embodiments of process 66, an account identifier of an account associated with the computing system of the new computing instance may be obtained, as indicated by block 74. This step may be performed with the above-described account identifier module 64 of FIG. 2. The process 66 also includes obtaining an address of an analytics platform, as indicated by block 76, which may include the above described techniques for obtaining an Internet protocol address or a uniform resource identifier. In some embodiments, the address may be obtained by recalling the address from memory allocated to a collector, and the address may be encoded as a constant in code executed as the collector. In some embodiments, each collector of each monitored computing instance of each monitored computing system may obtain the same address.

The process 66 in some embodiments includes initiating a session with the analytics platform by transmitting a request to monitor the computing instance to the obtained address, as indicated by block 78. Initiating a session may include transmitting a signal indicative of the existence of a new computing instance to be monitored to the analytics platform. In some embodiments, the signal indicative of the new instance may constitute a request. In certain embodiments, the first communication between the analytics platform and the new computing instance may be a transmission by the collector or other transmissions from the new computing instance to the analytics platform. Initiating communication from the new computing instance is expected to simplify configuration of the analytics platform, as the analytics platform, in some embodiments, may not need to be reconfigured manually for each new computing instance, though not all embodiments necessarily provide this benefit. The initiated session, in some embodiments, may include transmissions from a monitored computing instance to the analytics platform and transmissions from the analytics platform to the monitored computing instance. As explained in greater detail below, data received at the analytics platform may be associated with the session, and the session may be associated with the monitored computing instance, for example with the identifier of the new computing instance, such that session data received at the analytics platform may be associated with the monitored computing instance and, in some embodiments, the account identifier.

The process 66 also includes, in this embodiment, transmitting the instance identifier and the account identifier to the analytics platform for association with the session, as indicated by block 80. In some embodiments, this transmission may be a transmission by which a session is initiated, as described above with reference to block 78. In other embodiments, the session may be initiated, and the identifier is may be transmitted subsequently, for example by the collector controller either in response to confirmation from the analytics-platform computing system 12 that the session has been established or in response to a request for the identifiers from the analytics-platform computing system 12.

Embodiments of the process 66, like the other processes described herein, are not limited to the particular sequence illustrated in the figure. For example, in some embodiments, account identifiers and instance identifiers may be obtained after initiating a session. Further, like the other systems, devices, and processes described herein, not all embodiments necessarily include all the features of process 66, for instance some embodiments may omit certain steps or include additional steps.

Figure 4:
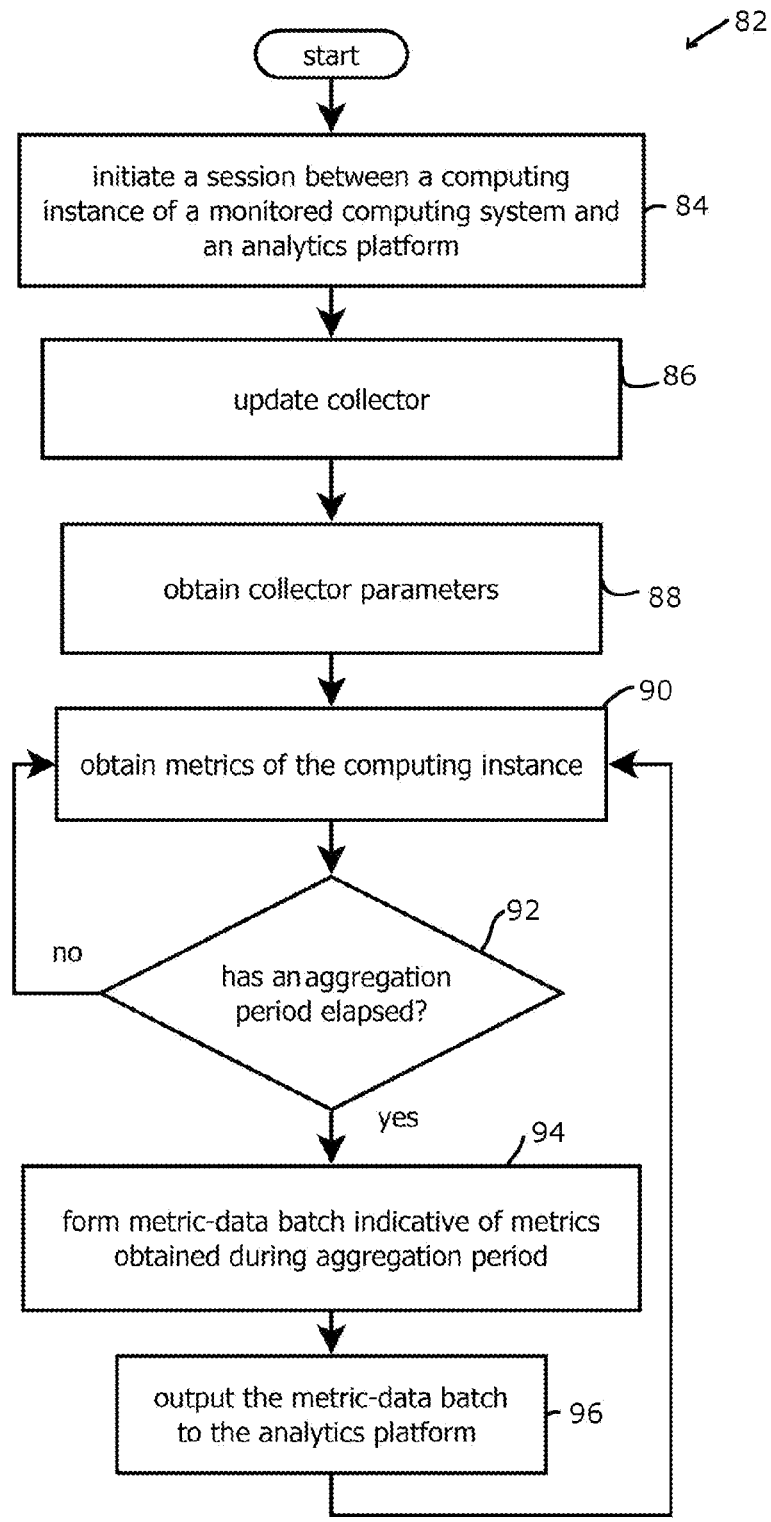
FIG. 4 shows an embodiment of a process for outputting metrics of a monitored computing instance to an analytics platform.

FIG. 4 illustrates an embodiment of a process 82 for reporting data from a monitored computing instance. The process 82 may be performed by the collector 30 described above with reference to FIG. 2, though embodiments are not limited to the variations of the collector 30 described above. As described in greater detail below, the process 82 may convey data from the monitored computing instance to the analytics platform in a fashion that is relatively easy for users to configure, is relatively robust to interruptions in network communication, and is relatively parsimonious with bandwidth, while providing relatively high resolution indicators of the performance of a monitored computing instance.

The illustrated process 82, in some embodiments, begins with initiating a session between a computing instance of a monitored computing system and an analytics platform, as indicated by block 84. This step, in some embodiments, may be performed by the above-described session initiator 88 of FIG. 2 by executing the process 66 of FIG. 3. In some embodiments, the session is initiated by the monitored computing instance, and in other embodiments, the session is initiated by the analytics platform or by some other computing device.

Next, in some embodiments, the process 82 includes updating a collector of the monitored computing instance, as indicated by block 86. Updating the collector may be performed by the above-described collector updater module 40 of FIG. 2 using the techniques described with reference to the operation of this module 40.

The process 82, in some embodiments, also includes obtaining collector parameters, as illustrated by block 88. Obtaining collector parameters may include obtaining user configurable parameters that control the operation of the collector. Examples of user configurable parameters include selections by a user of the monitored computing system (for instance a user who controls or builds the monitored computing system in order to serve customers of the user) regarding which data is transmitted from the monitored computing instance, how the data is pre-processed and processed, and how the data is identified and grouped. For instance, the collector parameters may include a parameter that specifies how data is to be batched, for example the duration of a subsequently described aggregation period, such as the above-described time-based batches of metrics.

Other examples include data indicative of which metrics are to be transmitted to the analytics platform and the format for those transmissions. For instance, some embodiments may specify that different categories of metrics be transmitted in a particular sequence, such that the categories of the metrics can be identified at the analytics-platform computing system 12 based on the sequence without also transmitting labels for the categories, thereby potentially reducing the amount of data exchanged between the collector and the analytics platform. By way of example, the collector parameters may specify that a processor usage metric is transmitted first, followed by a delimiter, such as a comma, followed by a memory usage metric, then a delimiter, followed by a network usage metric, and so on. The collector parameters, including sequences for data transmission, may be obtained from the analytics-platform computing system 12, which may retrieve the collector parameters based on an account identifier received upon the initiation of a session in step 84 and may transmit the collector parameters to the collector. Establishing such a sequence based on collector parameters is expected to reduce network usage relative to systems that transmit parameters using various markup languages, such as extensible markup language (XML) or JavaScript object notation (JSON). In other embodiments, the transmitted data may be labeled with each transmission, and this benefit may not be provided.

Next, in some embodiments of process 82, metrics of the computing instance may be obtained, as indicated by block 90. Obtaining metrics may be performed with the above-described data acquisition module 36 using the techniques described with reference to the operation of that module. In particular, some embodiments may obtain metrics with the above-described interface modules 52, 54, and 56 by communicating with the operating system interface 32.

Some embodiments of the process 82 include determining whether an aggregation period has elapsed, as illustrated by decision block 92. The aggregation period may be a period of time within which obtained data is packaged or otherwise grouped into time-based buckets or other batches. The duration of the aggregation period may be one of the obtained collector parameters obtained in step 88. In some embodiments, the duration may be one of the durations described above with reference to the data aggregator 60. The duration may be selected based on trade-offs between the amount of data to be conveyed between the analytics platform and the monitored computing instance and the desired resolution of analyses performed by the analytics platform, as described below.

Upon determining that the aggregation period has not elapsed, in response, the process 82 may return to block 90. Alternatively, upon determining that the aggregation period has elapsed, in response, the process 82 may proceed to block 94.

As illustrated by block 94, the process 82 in some embodiments includes forming a metric data batch indicative of metrics obtained during the aggregation. Forming a metric data batch may include the steps described above with reference to the operation of the data pre-processor module 58 and the data aggregator module 60 of FIG. 2. In some embodiments, forming metric data batches includes calculating various statistics such as maximum values, minimum values, median values, average values, counts, or binary alarms, and the like. Forming a metric data batch may also include sequencing the data according to the sequence obtained with the collector parameters, including inserting delimiters between data values, as described above with reference to step 88. Alternatively or additionally, some embodiments may include encoding the data in a markup language, such as XML or JSON, for instance, encoding the data in a hierarchical tree data structure having metadata descriptive of nodes of the tree.

Next, in the present embodiment of process 82, the formed metric data batch may be output to the analytics platform, as indicated by block 96. Outputting the data may include outputting the data with the above-described input/output module 34 of FIG. 2 using the techniques described above with reference to the operation of this module. In some embodiments, the data is output with the process described below with reference to FIGS. 5 and 6. Other embodiments, however, may output the data without performing some or all of the steps of FIGS. 5 and 6, which is not to suggest that other features described herein may not also be omitted, and some embodiments may perform the process 82 in a different order from the steps depicted, without including some of the steps depicted, or by including additional steps, as is the case with the other processes described herein.

Figure 6:
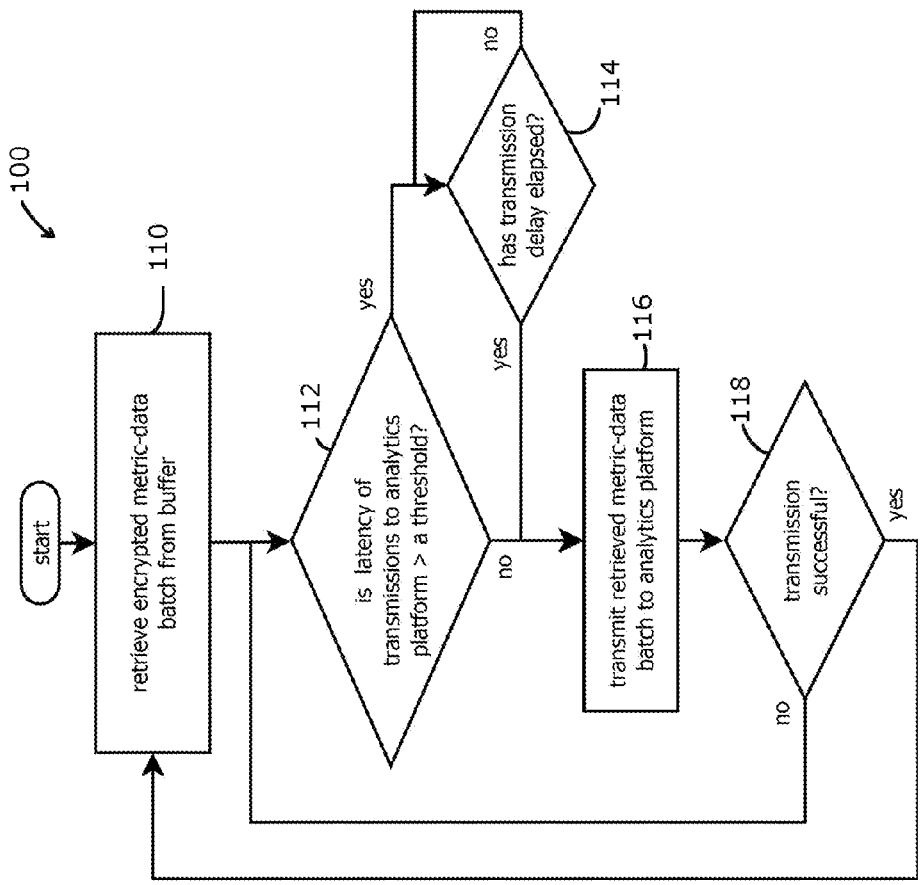
FIG. 6 shows an embodiment of a process for transmitting gathered data indicative of performance of a monitored computing instance to an analytics platform.
Figure 5:
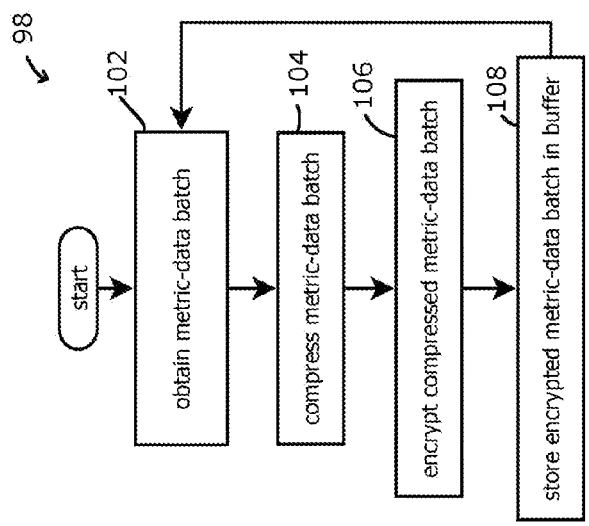
FIG. 5 shows an embodiment of a process for preparing gathered data to be transmitted to an analytics platform.

FIGS. 5 and 6 illustrate processes 98 and 100 for outputting data from a monitored computing instance to an analytics platform. In some embodiments, the processes 98 and 100 may be performed during overlapping time periods, for example concurrently by different threads or processes of the monitored computing instance. As explained in greater detail below, the concurrent operation may facilitate buffering of data such that the processes 98 and 100 are robust to interruptions in network traffic, mitigating data loss during such interruption, and mitigating surges of data following restoration of service after an interruption or other source of spikes in data to be transmitted. Other embodiments, however, may perform the processes 98 and 100 non-concurrently, for example sequentially.

The process 98, in some embodiments, begins with obtaining a metric data batch, as indicated by block 102. Obtaining a metric data batch may include obtaining a metric data batch through the steps up to and including the step 94 of process 82 described above. The obtained metric data batch may include a batch of data obtained over some time period, such as over an approximately or exactly 0.5 second, 1 second, 5 second, 20 second, or 5 minute or less window of time.

In some embodiments, the process 98 includes compressing the metric data batch, as illustrated by block 104. The data may be compressed with a variety of techniques, for example using the above-described compression module 50 of FIG. 2. In some embodiments, the data may be compressed by identifying patterns existing within the data, such as a long string of repeating characters, associating the pattern with a shorter string, replacing the pattern with the shorter string, and outputting the result. For instance, a string of zeros may be replaced with a string that identifies the character zero and the number of zeros. Similar techniques may be used for other repeating patterns, such as repeating patterns of zeros and ones.

In some embodiments, the process 98 includes encrypting the compressed metric data batch, as illustrated by block 106, and which may be performed in some embodiments by the above-described encryption module 48 of FIG. 2. Encrypting the compressed metric data batch may include encrypting the data based on an encryption key obtained during the above-described process for initiating a session between a computing instance and an analytics platform. Encryption may also include salting the data with a random number of leading or trailing values to impede efforts to measure an amount of data being transmitted. Encryption, like many of the other steps described herein, may be performed at a different part of the process 98 or the process 100. For example, encryption may be performed on a group of metric data batches retrieved from a buffer during the process 100, as described in greater detail below. Encrypting a larger collection of such data is expected to result in greater obfuscation of the encrypted data.

Next, some embodiments of the process 98 may store the encrypted metric data batch in a buffer. The buffer may be, or may be controlled by, the buffer module 46 described above with reference to FIG. 2. In some embodiments, the buffer is a first-in first-out buffer, for example a ring buffer having memory for storing data, memory for storing an input pointer value that is incremented through addresses of the ring buffer each time a new value is written to one of the addresses of the ring buffer, and memory for storing an output pointer value that is incremented through addresses of the ring buffer each time a value is read from one of the addresses of the ring buffer. Embodiments having a ring buffer may also include an input counter for incrementing the input pointer and an output counter for incrementing the output pointer. A ring buffer is expected to occupy a predetermined amount of memory of the computing instance, potentially preventing the collector from causing a memory error by consuming excess memory of the computing instance. Other embodiments, however, may not use a ring buffer. For example, some embodiments may consume additional memory as additional data is buffered. In other embodiments, the buffer is a last-in first-out buffer. The selection between these types of buffers may depend upon whether a user prefers more up-to-date data to be delivered first or whether the data arrive in the sequence with which it was acquired. The buffer is expected to store data during periods in which data is acquired faster than it can be transmitted, for example during periods in which network traffic is slow, during periods in which the analytics-platform computing system 12 is overloaded, or during periods in which the acquisition of data surges, for example when the computing instance being monitored has a systemic error. Other embodiments, however, may not include a buffer, and data may be transmitted as it is acquired, which is not to suggest that any other feature may not also be omitted in some embodiments.

The buffer data may be transmitted by executing the process 100 of FIG. 6. In some embodiments, the process 100 begins with retrieving encrypted metric data batches from the buffer, as illustrated by block 110. A single batch may be obtained, a portion of a single batch may be obtained, or multiple batches may be obtained from the buffer per retrieval request. As described above, the obtained batches may be the last batches input into the buffer or the oldest batches in the buffer, or the batches may be prioritized with some other technique, for example based on the content of the data within the batch.

Some embodiments of the process 100 include determining whether a latency of transmissions to the analytics platform (which may include time taken for the platform to process receipt of the data) is greater than a threshold, as illustrated by block 112. This determination may be performed by the above-described throttle module 44 of FIG. 2. High latency is expected to be indicative of surges in network traffic, issues with the transmission of data across the network, or the analytics-platform computing system 12 being overloaded. The latency may be determined based on a variety of techniques. For example, receipt of transmissions to the analytics platform by a monitored computing instance may be confirmed by the analytics platform transmitting an acknowledgment signal to the monitored computing instance. The transmission to the analytics platform may include a transmission identifier, and the acknowledgment signal may reference that transmission identifier, such that the throttle module 44 may identify which acknowledgment signal is associated with which transmission and calculate a difference between the time at which the transmission was sent and the time at which the acknowledgment signal was received to determine a latency. In other embodiments, the acknowledgment signal may include data indicative of the time at which the acknowledgment signal was received, or data requesting a delay.

The threshold may be a predetermined threshold or a dynamic threshold that changes based on any of a variety of factors. In some embodiments, the threshold is one of the obtained collector parameters described above with reference to step 88 of FIG. 4. The threshold, in some embodiments, may be adjusted based on an amount of data stored in the buffer module 46 of FIG. 2. For example, the threshold may be increased in response to an increase in the amount of data in the buffer, in response to the amount of data in the buffer exceeding some buffer threshold, or some other factor. The threshold may be decreased based on similar factors decreasing.

Upon determining that the latency is greater than the threshold, in response, some embodiments of the process 100 may proceed to decision block 114, in which the process 100 may wait until a transmission delay has elapsed before attempting to transmit additional metric data. The determination of block 114 may be performed by the throttle module 44 described above with reference to FIG. 2. In some embodiments, the transmission delay may be a predetermined value or a dynamically determined value that varies based on one or more factors. For example, the transmission delay may be adjusted along with the latency threshold in the manner described above based on the amount of data stored in the buffer module 46 of FIG. 2. In another example, the delay may be adjusted based on variability, such as a standard deviation, range, or variance, of the latency of transmissions to the analytics platform, a technique which is expected to exploit relatively frequent periods of low latency intermingled with periods of higher latency.

Waiting until the transmission delay has elapsed is expected to throttle data received by the analytics-platform computing system 12, thereby potentially preventing the analytics-platform computing system 12 from being swamped by a spike in network traffic following a network outage and potentially avoiding the loss of data, without the analytics-platform computing system 12 centrally controlling transmission times. Further, such throttling is expected to protect the analytics-platform computing system 12 from sudden burst of traffic during a systemic failure, for example during a failure affecting multiple monitored computing systems within a data center of a cloud service provider. Throttling the transmission of metric data based on latency is also expected to coordinate the operation of multiple collectors across multiple monitored computing systems, without necessarily requiring centralized control by the analytics-platform computing system 12 to coordinate the transmission of the various collectors. This is expected to reduce the complexity of configuring the analytics platform and facilitate use of the analytics platform as a service. Other embodiments, however, do not throttle network traffic or centrally control transmission.

Upon determining that the transmission delay has not elapsed, the process 100 returns to block 114 and continues to wait. Alternatively, upon determining that the transmission delay has elapsed, the process 100 of this embodiment proceeds to block 116. Similarly, in the decision step of block 112, upon determining that latency of transmissions to the analytics platform is not greater than the latency threshold, the process 100 of this embodiment also proceeds to block 116.

Embodiments of the process 100 include transmitting metric data batches to the analytics platform, as illustrated by block 116. Transmitting the metric data batch may include encoding the metric data batch in various networking protocols. In some embodiments, the data may be encoded in a file transfer protocol, in a hypertext transfer protocol (e.g., HTTP Secure), or in SPDY, for instance.

Some embodiments of the process 100 include determining whether the transmission was successful, as indicated by determination block 118. Determining whether the transmission was successful may include determining whether an acknowledgment signal is received from the analytics platform indicating that the transmitted data was received. In some embodiments, this determination may include determining whether such a signal is received within a timeout threshold. Upon determining that transmission was not successful, some embodiments of the process 100 may return to decision block 112 in response. Alternatively, upon determining that transmission was successful, in response, some embodiments of the process 100 may return to block 110, and additional data may be retrieved for transmission.

The processes 98 and 100 are expected to transmit metrics of the monitored computing instance in a manner that is relatively easy to configure, that is relatively robust to changes in network traffic and changes in the capacity of the analytics-platform computing system 12 to process data, and is relatively unlikely to lose data. Not all embodiments, however, provide some or all of these benefits.

Figure 7:
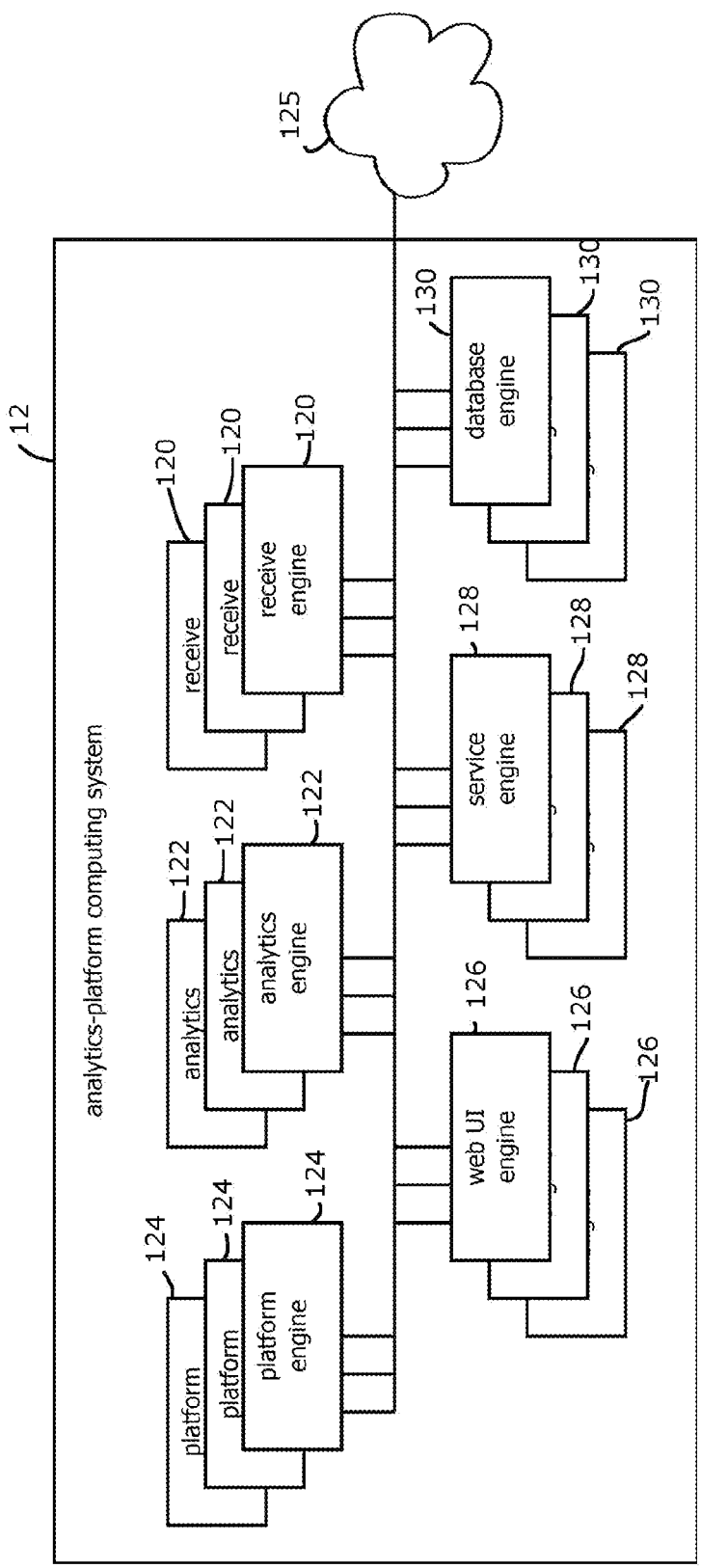
FIG. 7 shows details of the analytics-platform computing system of FIG. 1.

FIG. 7 illustrates details of an embodiment of the analytics-platform computing system 12 introduced in FIG. 1. In some embodiments, the analytics-platform computing system 12 is a scalable cloud-based computer system management program capable of providing computer system management as a service to a plurality of accounts each having computer systems with a plurality of monitored computing instances. Further, some embodiments of the analytics-platform computing system 12 may be capable of providing real-time or near real-time analyses and reports of the operation of the monitored computing systems. Not all embodiments, however, provide some or all of these benefits.

Some embodiments of the analytics-platform computing system 12 are implemented on a cloud computing system having a plurality of computing instances and capable of provisioning additional computing instances dynamically, for example based on load, a desired response time, or other factors. Such implementations are expected to reduce costs relative to systems that statically include sufficient computing power for maximum expected loads, as such systems often include computing resources that remain unused for much of the time. However, embodiments are not limited to cloud-based implementations or scalable implementations.

In some embodiments, the analytics-platform computing system 12 includes one or more receive engines 120, one or more analytics engines 122, one or more platform engines 124, one or more web user interface engines 126, one or more service engines 128, and one or more database engines 130. In some embodiments, the engines 120, 122, 124, 126, 128, and 130, or a subset thereof, may be modules of an application embodying the analytics-platform, or in some embodiments, these engines 120, 122, 124, 126, 128, and 130, or a subset thereof, may be separate processes, for example separate concurrent processes executing on separate monitoring computing instances 26 or separate processes executing on the same monitoring computing instance 26. In some embodiments, the analytics-platform computing system 12 may be characterized as a distributed computing system in which the engines 120, 122, 124, 126, 128, and 130 operate on separate virtual machines or separate physical computers that may be co-located or may be geographically distributed. The engines 120, 122, 124, 126, 128, and 130 may be capable of communicating with one another bi-directionally, for example via a network (such as a local or wide area network Ethernet connection, via the Internet), via a bus or backplane of a computing device, via parameters passed between software modules (such as values passed by reference or by copies), or through other techniques. Further, the analytics platform computing system 12 may be capable of communicating bi-directionally with the network 25, for example sending data to and receiving data from the above-described collectors 30 and client devices 20, 22, and 24.

The illustrated embodiment includes an equal number of each engine and three of each engine 120, 122, 124, 126, 128, and 130, but other embodiments may include different numbers of each engine relative to one another and relative to the number depicted in FIG. 7. For example, some embodiments may include additional database engines 130 that are added in response to increases in the amount of data stored by the analytics-platform computing system 12, increases in response to the amount of requests for data to be stored or retrieved from the analytics-platform computing system 12, or other factors. Similarly, other engines 120, 122, 124, 126, or 128 may be added or removed based on load, for instance based on response time, requests, commands, etc.

While the illustrated engines 120, 122, 124, 126, 128, and 130 and their components described below are illustrated and described with reference to discrete functional blocks, these components may be implemented in hardware or software that is intermingled, conjoined, subdivided, or otherwise differently organized.

In some embodiments, each of the engines 120, 122, 124, 126, 128, and 130 may be executed on a monitoring computing instance 26 within an operating system of the monitoring computing instance. And each of the engines 120, 122, 124, 126, 128, and 130 and the analytics-platform computing system 12 may receive data via a load balancer server, which may route tasks and data to various instances of the engines 120, 122, 124, 126, 128, and 130 based upon unused capacity within these engines.

Figure 8:
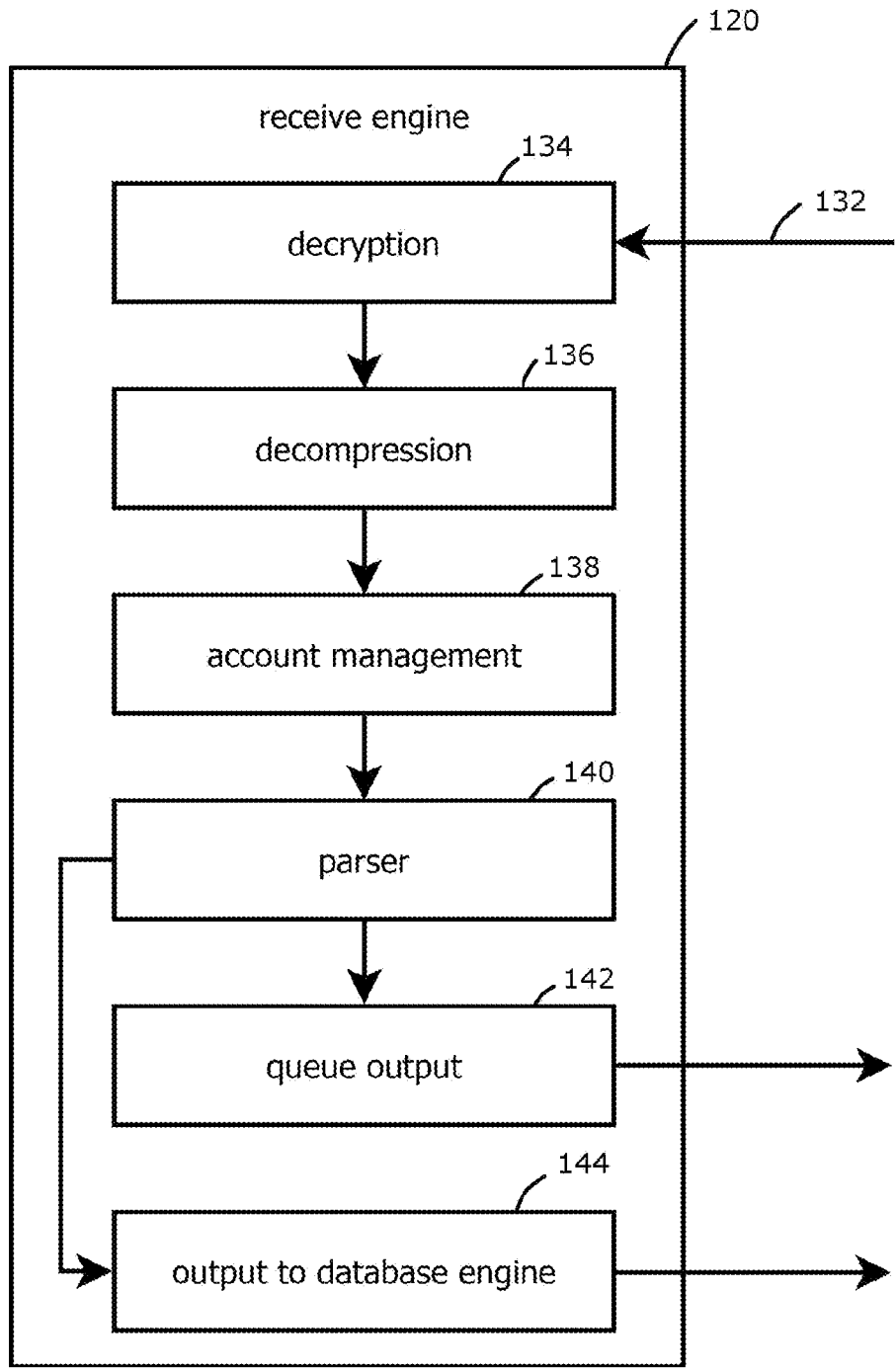
FIG. 8 shows an embodiment of a receive engine of the analytics-platform computing system of FIG. 7.

FIG. 8 illustrates additional details of an embodiment of the receive engine 120 of FIG. 7. In this embodiment, the receive engine 120 includes an input 132, a decryption module 134, a decompression module 136, an account management module 138, a parser module 140, a queue output module 142, and an output module 144 to the database engine 130 of FIG. 7. As described in greater detail below, the receive engine 120, in some embodiments, may be capable of receiving data from the collectors 30 (FIG. 1), decrypting the received data, decompressing the received data, associating the received data with an account and with a computing instance, parsing the received data, and outputting the parsed data to a queue for subsequent processing by the analytics engine 122 and to the database engine 130 for storage in memory. The receive engine 120 may also be capable of maintaining a session with one or more collectors, associating the received data with the corresponding session, and transmitting data (e.g., acknowledgement signals) to the appropriate collector of the corresponding session. In some embodiments, the receive engine may decode the above-described network transfer protocols and validate the status of an account and credentials associated with the account for the monitored computing system, for example by querying the service engine 128 for a subscription status and determining whether a subscription is current or lapsed. Some embodiments may not process data that is received without a corresponding active subscription.

Some embodiments may include one instance of the receive engine per session, or other embodiments may include a single receive engine that processes multiple sessions. In certain embodiments, sessions may be managed by the platform engine 124 or the service engine 128 described below, and the receive engine 120 may receive data that is already associated with a session or a corresponding collector.

In some embodiments, the decryption module 134 may receive data from the input 132, such as encrypted metric batches from the collectors and decrypt the received data. In some embodiments, the receive engine 120 may obtain a decryption key associated with the corresponding collector, monitored computing instance, monitored computing system, or account (e.g., from the service engine 128), and the decryption engine 134 may decrypt data based on this obtained (e.g., received) encryption key.

The decryption module 134 may output the decrypted data to the decompression module 136, which may decompress the received data, such as the received metric batches from the collectors 30. Decompression may include identifying strings in the decrypted data corresponding to larger patterns in the uncompressed metric data and replacing the identified strings with the corresponding larger pattern. In some embodiments, data indicative of these patterns and the corresponding identifying strings may be transmitted to the receive engine from the collector or from the platform engine 124.

The decompressed data may be transmitted from the decompression module 136 to the account management module 138, which may associate the decompressed data with an account, a monitored computing system, or a monitored computing instance (for example with each of these entities). In some embodiments, the account management module may attach metadata to the decompressed data indicating the association. Some embodiments of the account management module 138 may also retrieve or otherwise obtain configuration data of the collector 30 indicative of the formatting of the metric data batches transmitted from the collector 30. For example, the account management module 138 may obtain data indicating delimiters and which fields are transmitted in which sequence and, in response, the account management module 138 may label the uncompressed data with metadata indicating the corresponding fields, for example by inserting XML tags and attributes or JSON names for name-value pairs and removing delimiters.

The output of the account management module 138 may be transmitted to the parser module 140, which may parse the received data. The input to the parser module 140 may be a serialized data-structure, e.g., a document or string expressed in XML or JSON. In some embodiments, the parser 140 may de-serialize the input data into a hierarchical or graph data structure held in random access memory, such as a tree, an object within an object oriented programming environment, a multi-dimensional array, or the like. In some embodiments, the parser module 140 may parse the received data into a data structure that, when accessed with the appropriate tools, can be queried, iterated through, or otherwise interrogated. A de-serialized data structure is expected to provide faster analysis and storage of data than a serialized string or document, as data can be accessed and manipulated without potentially having to iterate through every character of the string or document, though some embodiments may leave the data in a serialized format or some other format.

The output of the parser 140 may be transmitted to the queue output module 142 and the output module 144 to the database engine 130 (FIG. 7). In some embodiments, the outputs 142 and 144 may be separate processes or separate threads that output data during overlapping time periods, for instance concurrently or approximately concurrently. Outputting the data in parallel is expected to reduce the time between when data is first received and when analyses and results of the data are reported to users, though not all embodiments necessarily provide this benefit. Indeed, some embodiments may not output data to different destinations or may not output data in parallel, which is not to suggest that any other feature described herein is required in every embodiment. In some embodiments, the queue output module 142 may transmit the received data to a buffer (e.g., a queue) from which the subsequently described analytics engine 120 pulls tasks or to a queue in the platform engine 124 that assigns tasks to the analytics engine 120. The output module to the database engine 130 may be capable of transmitting the received data to the database engine 130 and instructing the database engine 130 to write the data to memory.

Figure 9:
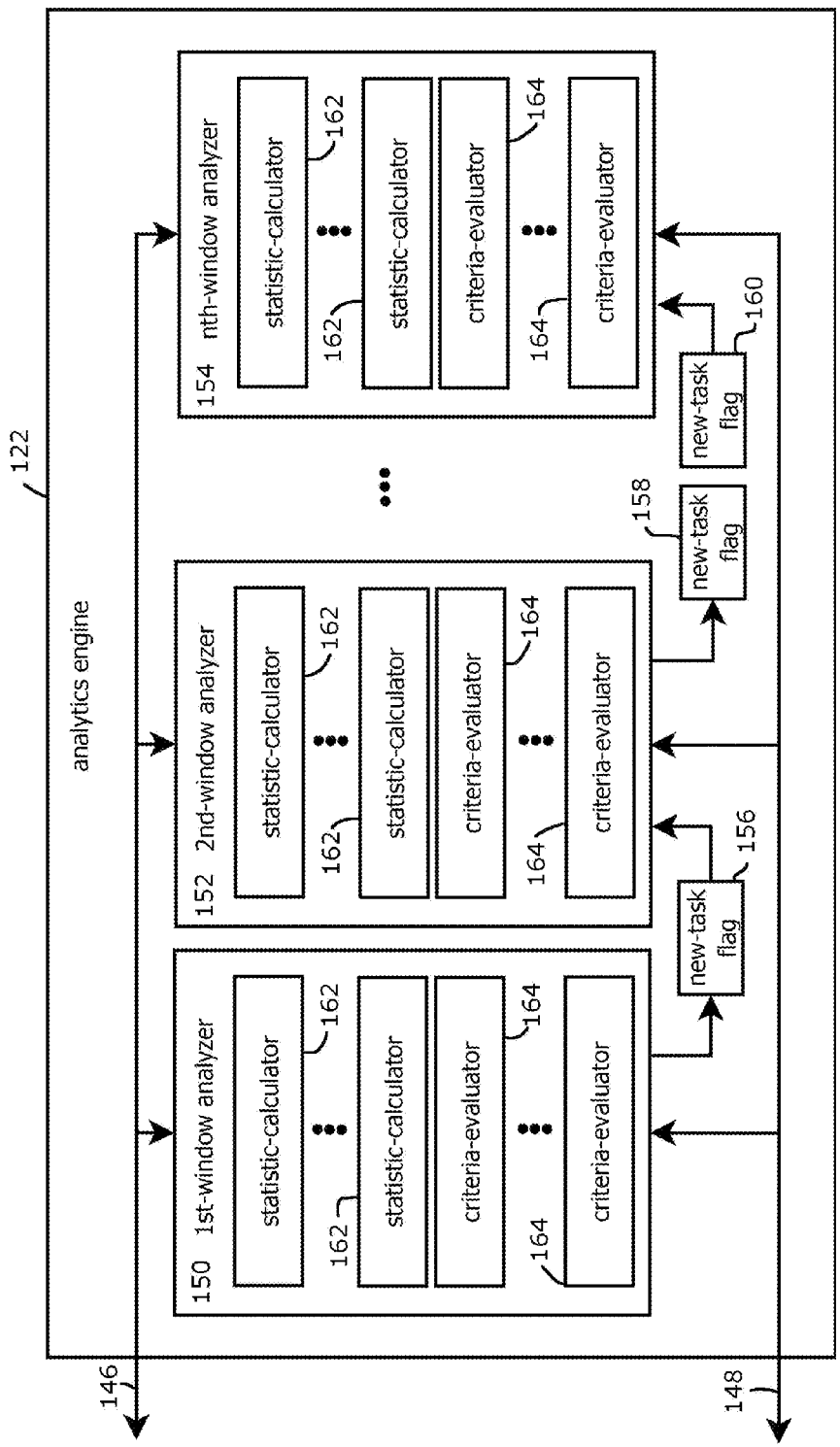
FIG. 9 shows an embodiment of an analytics engine of the analytics-platform computing system of FIG. 7.

An embodiment of the analytics engine 122 is shown in greater detail in FIG. 9. In some embodiments, the analytics engine may include a plurality of analysis functions, examples of which are described below, that vary according to the priority of their activities. The analytics engine may receive signals (including metric data) from the receive engine 120, for example signals from the queue output module 142 indicating that data is available to be analyzed or other tasks are available to be performed, or some embodiments of the analysis engine 122 may include a set of processes or threads that remove tasks from a queue hosted by the platform engine 124. Some embodiments may include one analysis engine per session with a collector, one analysis engine for multiple sessions, one analysis engine per monitored computing system, one analysis engine per account, or one analysis engine for multiple monitored computing systems, depending upon the computing load and the computing power of the analysis engine 122.

In some embodiments, the analysis engine 122 may include a metric data input/output 146, a command input/output 148 by which new commands or tasks are identified or transmitted, a plurality of window analyzers 150, 152, and 154, and a plurality of new task flags 156, 158, and 160 that may signal the availability of new collections of data to be processed to each of the window analyzers 152 through 154, as described in greater detail below.

The window analyzers 150, 152, and 154 may each be configured to analyze a different temporal window of data, for example window analyzer 150 may be configured to analyze 20-second windows of data, the window analyzer 152 may be configured to analyze 10-minute windows of data, and the window analyzer 154 may be configured to analyze one-month windows of data. Details of the operation of the window analyzers 150, 152, and 154 described in greater detail below with reference to FIG. 12. The window analyzers 150, 152, and 154 may receive data from the database engine 130 by transmitting queries to the database 130 or may receive data directly from the receive engine 120 via the input/output path 146. Similarly, the window analyzers 150, 152, and 154 may write results to the database engines 130 by transmitting results and write commands via the input/output path 146 to the database engines 130.

The operation of the window analyzers 150, 152, and 154 may be staged such that each window analyzer 150, 152, and 154 triggers the next window analyzer when the appropriate time for that next window analyzer to run occurs, for example when the next window of the adjacent window analyzer starts. In some embodiments, window analyzers 152 through 154 may be started based on a signal from a window analyzer tasked with analyzing a smaller window, the signal indicating that a new instance of the larger window has started. Starting window analyzers in this fashion, based on signals from more frequently operated window analyzers, is expected to conserve computing power and reduce the degree to which the operation of a process or thread analyzing one month windows of data, for example, interferes with the operation of processes or threads analyzing shorter windows of data. This technique is expected to expedite results from the first window analyzer 150, resulting in real-time or near real-time reporting of analyses of received metrics of monitored computing instances. Not all embodiments, however, provide this benefit or use this technique. For example, some embodiments may operate separate processes or threads for each of the window analyzers 150, 152, and 154 that operate generally continually and generally concurrently, e.g., an analysis for the trailing one-month window may be generally continually updated, rather than being updated once per-month.

Each window analyzer 150, 152, and 154 includes one or more statistics calculators 162 and one or more criteria evaluators 164. In operation, upon instantiation of each of the window analyzers 150, 152, 154 or upon a signal indicating that a window has closed or is near closing, each window analyzer 150, 152, and 154 may transmit a request to the database engine 130 for data measured within that closing window, data that arrived within that window, or results of calculations by other window analyzers 150, 152, and 154 based on such data (thereby reducing the amount of data requested and speeding operation). In some embodiments, the statistics calculators 162 may calculate statistics based on the results of the request. For example, statistics calculators 162 may calculate a maximum, a minimum, an average, a median, a mode, a count, a standard deviation, a range, a variance, or other statistics. Similarly, the criteria evaluators 164 may evaluate the data received from the query against various criteria, such as whether thresholds are crossed, whether certain trending rules have been satisfied (e.g., five or more consecutive increasing data points or two out of three data points outside of three standard deviations from a mean), or whether various states have obtained in the monitored computing instances, such as whether various error conditions have occurred in the monitored computing instances.

In some embodiments, window analyzers 152 through 154 may calculate statistics and evaluate criteria based on the result of calculated statistics or evaluated criteria from more frequently operated window analyzers. For example, window analyzer 152 may retrieve from the database engine 130 the results of statistics calculated by the first window analyzer 150. Retrieving results from other window analyzers is expected to reduce the amount of data processed by each of the window analyzers and speed operation of the analytics engine 122. However, some embodiments may retrieve all data received within an analyzed window for some or all of the calculated statistics or evaluated criteria within some or all of the windows.

Upon calculating statistics and evaluating criteria, the results may be written to the database engine 130. The results may include statistics by which various data visualizations, such as charts, may be formed and binary outputs, such as alarms. The window analyzers 150, 152, and 154 may also determine whether the next longer window has closed or is about to close. Upon determining that the next longer window has closed or is about to close, the window analyzers 150, 152, or 154 may set a new task flag 156, 158, or 160 for the next longer window analyzer, and in response, the next longer window analyzer 152 through 154 may begin an analysis based on the change in state of the new task flag 156, 158, or 160. By way of example, first window analyzer 150 may determine that a window to be analyzed by the second window analyzer 152 has closed, and in response, first window analyzer 150 may set new task flag 156 to true. In response to this change in new task flag 156, the second window analyzer 152 may begin analyzing the next longer window and reset the new task flag 156 to false. This process may be repeated for each of the window analyzers 152 through 154. The first window analyzer 150 may analyze each metric data batch received from the receive engine 120, or the first window analyzer 150 may receive commands from the platform engine 124, for example, indicating that a new window is ready for analysis. In other embodiments, a separate process or thread, such as a job scheduler operated by the platform engine 124 may schedule tasks for the window analyzers 150, 152, and 154. These tasks and other commands may be communicated to the window analyzers 150, 152, and 154 via the command input/output 148.

In some embodiments, the analytics engine 122 may be capable of obtaining an account identifier, an identifier of a monitored computing instance, or an identifier of a monitored computing system associated with the data to be analyzed, and based on these identifier(s) obtain user-configurable statistics, criteria, and window periods by which the data is to be analyzed. In some embodiments, analysis criteria may be stored in the database engine 130 and indexed according to an account identifier, an analysis identifier, a monitored computing instance identifier, or a monitored computing system identifier. Some embodiments may receive analysis specifications from users, for example via the client devices 20, 22, and 24, and the statistics calculators 162, window durations, and the criteria evaluators 164 may be configured to perform the requested calculations and criteria evaluations.

Figure 10:
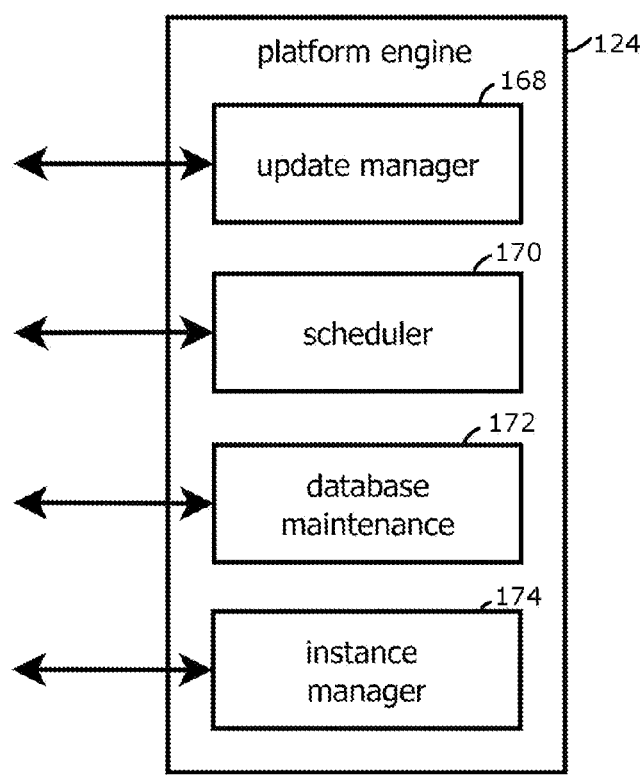
FIG. 10 shows an embodiment of a web user interface engine of the analytics-platform computing system of FIG. 7.

An embodiment of the web user interface engine 126 is illustrated in greater detail with reference to FIG. 10. The web user interface engine 126 may be configured to interface with client devices 120, 122, and 124 of FIG. 1, for example by providing an interface by which users of the analytics platform may monitor the performance of monitored computing systems and configure the operation of the analytics-platform computing system 12.

In some embodiments, the web user interface engine 126 may include an application program interface server 162, a web server 164, and a hypertext transport protocol secure service module 166. The HTTPS module 166 may encode and decode commands and data for transmission via a network protocol, such as the network protocols described herein, via the network 25 to and from the client devices 20, 22, and 24. In some embodiments, the web user interface engine 126 may be capable of validating credentials and accounts for users attempting to interface with the analytics-platform computing system 12. For example, the web user interface engine 126 may be operative to transmit request to the service engine 128 including user provided account identifiers and credentials and selectively allow access to particular account data based on whether the service engine 128 indicates the account identifiers and credentials are valid and whether a subscription is current.

The application program interface server 162 may be a server capable of parsing calls to the application program interface received over the network 25, for example from client devices 20, 22, or 24, and executing commands requested by the calls. For example, the API server 162 may be capable of querying data from the database engine 130 based on API calls requesting such a query, changing the configuration of monitoring or analyses of metrics based on API calls requesting such a change, or perform other tasks.

The web server 164 may be operative to generate instructions (e.g., instructions encoded in HTML, CSS, and JavaScript) for forming a user interface on the client devices 20, 22, and 24, such as a viewport of a browser displaying data visualizations of various metrics, statistics, and criteria evaluation results associated with various computing instances, monitored computing systems, or accounts. The web server 164 may also be capable of outputting a interactive user interface by which users may enter commands, for example by clicking, dragging, touching, speaking, or otherwise interacting with the client devices 20, 22, 24, and the web server 164 may be capable of responding to these commands by requesting additional data or different data and instructing a change in the user interface responsive to the command.

The web user interface engine 126 is expected to facilitate interactions with the analytics-platform computing system 12 by users who use the analytics-platform computing system 12 as a service, rather than operating their own instance of the analytics-platform computing system 12, thereby potentially reducing labor and equipment costs associated with monitoring a computing system. Other embodiments, however, may have a special-purpose application for displaying results and configuring the analytics-platform computing system 12.

Figure 11:
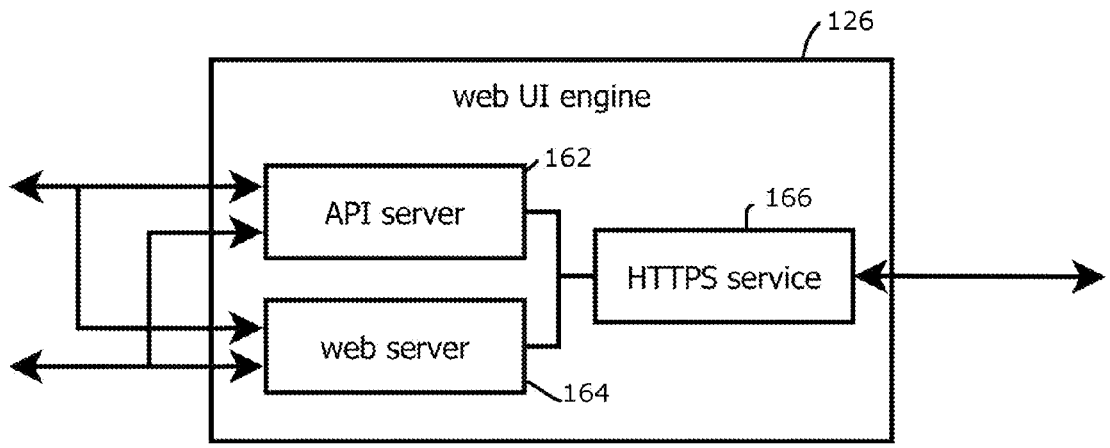
FIG. 11 shows an embodiment of a platform engine of the analytics-platform computing system of FIG. 7.

An embodiment of the platform engine 124 is illustrated in greater detail in FIG. 11. In some embodiments, the platform engine 124 may be capable of coordinating some or all of the operation of the other engines 120, 122, 126, 128, and 130, as described below. In some embodiments, the platform engine 124 includes an update manager module 168, a scheduler module 170, a database maintenance module 172, and an instance manager 174.

The update manager module 168 may be operative to cooperate with the collector updater module 40 described above with reference to FIG. 2 to manage the version of collectors executed by monitored computing instances. In some embodiments, the update manager 168 may be operative to receive data indicative of the current version of a collector executed by a monitored computing instance, determine whether the current version is the latest version or is a version specified by a user of an account associated with the monitored computing instance, and in response to determining that the current version is not the correct version, transmit the correct version to the monitored computing instance. In other embodiments, the update manager 168 may be capable of receiving a request for data indicative which version is correct, identifying the correct version, and if requested by a collector, the transmitting the correct version to the requesting entity, which may itself determine whether to upgrade.

In some embodiments, the platform engine 124 includes the scheduler 170, which may schedule operations of the window analyzers 150, 152, 154. In some embodiments, the scheduler 170 schedules the operation of the window analyzer 150, for example by signaling that a new window of data is available to be analyzed, and the other window analyzers 152 through 154 may begin their analyses based on the new task flags 156 through 160. Or in some embodiments, the scheduler 170 may schedule the operation of more, or all, of the window analyzes 150, 152, and 154.

The database maintenance module 172, in some embodiments, may coordinate and schedule certain activities of the database engine 30. For example, the database maintenance module 172 may schedule or coordinate the removal of data within the database engine 130 that is older than some date threshold and certain activities to improve performance, for example indexing of the database.

The instance manager 174, in some embodiments, may scale the analytics-platform computing system 12, for example, automatically, based on need for additional resources. In some embodiments, the instance manager 174 may periodically, or on some other schedule, determine a response speed of the analytics-platform computing system 12 to certain tasks, determine an amount of data received or analyzed by the analytics-platform computing system 12, determine a number of monitored computing instances or monitored computing systems, or some combination thereof, and based on this determined data, the instance manager 174 may request additional instances of various engines 120, 122, 124, 126, 128, or 130 or terminate such instances. The instance manager 174 may include machine images including an operating system and applications for instantiating the various engines 120, 122, 124, 126, 128, and 130. Automatically scaling the analytics-platform computing system 12 based on need is expected to reduce the cost of operating the analytics-platform computing system 12, as resources are procured as needed rather than being purchased and operated in anticipation of a worst-case scenario. However, some embodiments do not automatically scale, or other embodiments may scale automatically but provide other benefits.

As noted above with reference to FIG. 7, some embodiments of the analytics-platform computing system 12 may include the service engine 128. The service engine 128 may contain components related to customer accounting. For example, account identifiers, credentials associated with accounts, collector configurations associated with accounts, and analysis configurations associated with accounts. The service engine may also include data indicative of subscriptions, such as data indicative of account balances, data indicative of service-level agreements, data indicative of account duration, and data indicative of costs. The service engine may also be operative to generate reports based on these accounts and signal other components of the analytics-platform computing system 12 when such components are in need of data indicative of the accounts or account related data.

The database engine 130, in some embodiments, may be a relational or a non-relational database. Non-relational databases are expected to provide certain benefits relating to the speed, flexibility, and the scalability of the analytics-platform computing system 12. In some embodiments, the database engine 130 hosts a non-relational database without external load-balancing that is schema free, or is capable of storing data in non-predetermined fields and organization. Some embodiments may include a database capable of storing data in the form of documents, rather than in the form of tables, such as XML documents or JSON documents.

In some embodiments, the database engine includes an instance of Mongo DB or other non-relational databases. For example, some embodiments may include a non-relational database that organizes data hierarchically, in a tree structure, or a data structure in which nodes have a parent and child relationship with each child having only one parent, but some parents potentially having multiple children. For instance, the field "processors" may be a node, with multiple child fields named "processor," one for each processor, each of which may have child nodes named "processor usage," "processor temperature," and "processes." Some embodiments may store the data in a network model, for example as a graph database in which child nodes are not limited to a single parent node.

A non-relational database is expected to be relatively flexible, as the relationship between various stored fields need not necessarily be predefined by a user to begin collecting data, and a non-relational database is expected to scale relatively readily. However, embodiments are not limited to the above-described non-relational databases. Some embodiments may include a relational database, a memory image, a document repository, or other organization of data.

Figure 12:
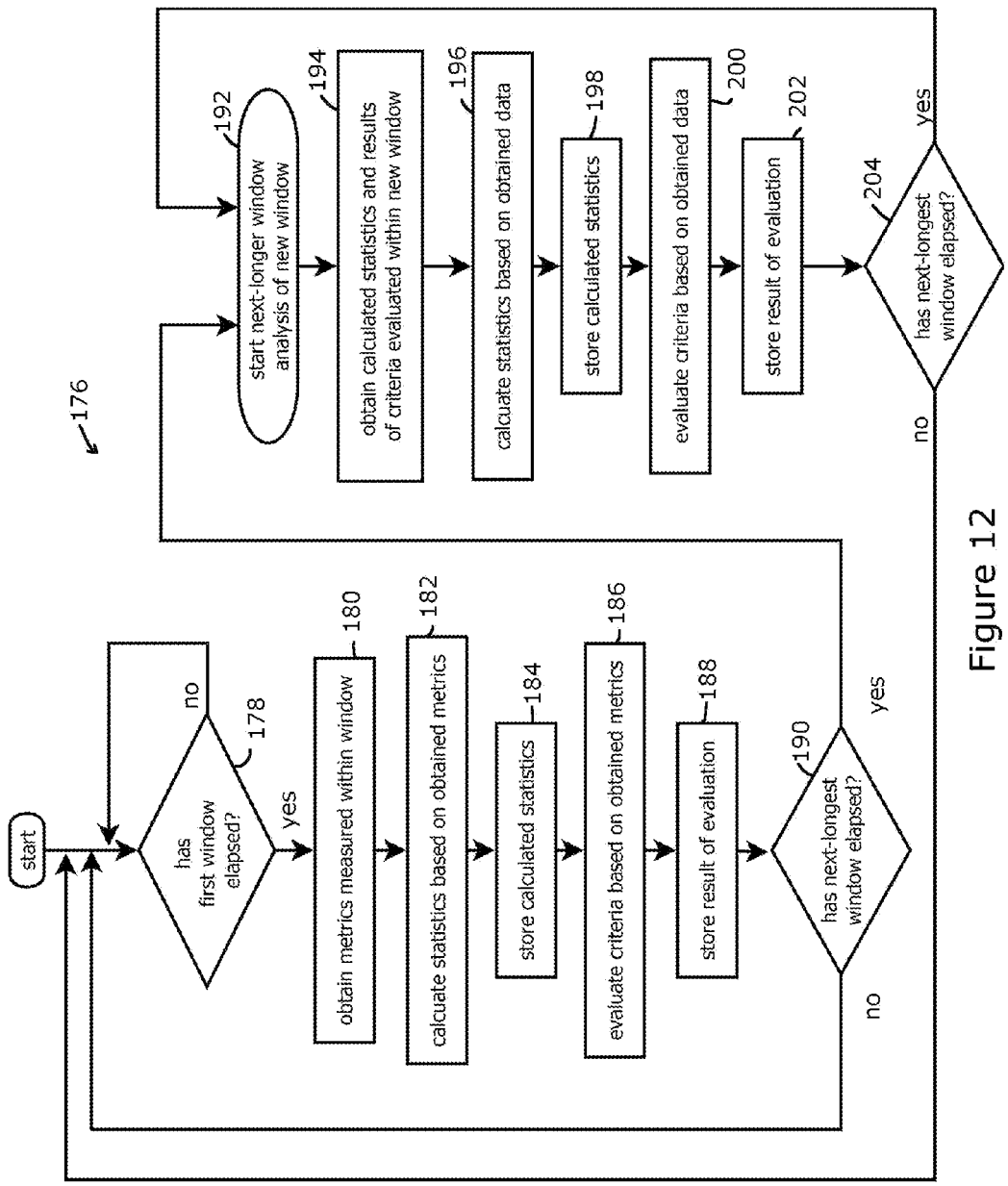
FIG. 12 shows an embodiment of a process for analyzing data received from a monitored computing system.

FIG. 12 illustrates an example of a process 176 for analyzing data received from monitored computing instances. The process 176, in some embodiments, may be performed by the analytics engine 122 described above with reference to FIG. 9, but embodiments of the process 176 are not limited to this configuration. In this embodiment, the process 176 begins with determining whether a first window has elapsed, as stated by decision block 178. Upon determining that a first window has not elapsed, the process 176 continues to wait and the determination 178 is repeated. In some embodiments, the first window of decision block 178 may be a shortest window of the windows analyzed by the process 176, for example a window of less than or approximately equal to 2 minutes, 1 minute, 30 seconds, 20 seconds, 10 seconds, 5 seconds, one second, or a half second. In some embodiments, a determination that the first window has elapsed may be made in response to the arrival of a batch of metrics collected during a time period corresponding to the first window by a collector.

Upon determining that the first window has elapsed, in response, the process 176 may proceed to obtain metrics measured within the window, as indicated by block 180, and calculate statistics based on the obtained metrics, as indicated by block 182. These steps 180 and 182 may be performed by the window analyzer 150 described above with reference to FIG. 9, in some embodiments. The metrics may be obtained by querying a database or receiving a parallel flow of metrics data transmitted to the window analyzer 150. The statistics may be calculated with the above-described statistics calculator module 162, in some embodiments.

The process 176 may also include storing the calculated statistics, as indicated by block 184, evaluating criteria based on obtained metrics, as indicated by block 186, and storing results of the evaluation, as indicated by block 188. The criteria may be evaluated with the criteria valuator modules 164 described above with reference to FIG. 9, and the stored statistics and results of the evaluation may be stored by the above-described database engine 130.

Some embodiments of the process 176 may include determining whether a next-longer window has elapsed, as indicated by decision block 190. Determining whether a next-longer window has elapsed may include comparing a value indicative of the beginning of the next-longer window to a current time and determining whether the difference is approximately equal to or greater than a threshold of the duration of the next longest window. In some embodiments, the first window analyzer 150 of FIG. 9 may determine whether the window to be analyzed by the second window analyzer 152 has elapsed in the decision block 190. Upon determining that the next-longer window has elapsed, in response, the process 176 may proceed to start an analysis of the next longer window, as indicated by initiation block 192. Alternatively, upon determining that the next longer window has not elapsed, the process 176 may return to decision block 178.

As indicated by initiation block 192, the process 176 may include starting a sub process for analyzing the next longer window. Analyzing the next longer window may include analyzing metrics of monitored computing instances that arrive during (or were measured during) the next longer window, for example during the window to be analyzed by window analyzer 152 of FIG. 9.

The process 176 includes, in some embodiments, upon the start of initiation block 192, obtaining calculated statistics and results of criteria evaluated within the new window, or the next longer window that initiated the process block 192, as indicated by block 194. For example, multiple instances of the window analyzed by the first window analyzer 150 may occur during the window analyzed by the second window analyzer 152, and the results of these multiple analyses may be obtained in step 194, for instance by querying the database engine 130. In some embodiments, the metric data obtained from the collector may also be obtained in step 194. After obtaining this data, some embodiments of process 176 include calculating statistics based on the obtained data, as indicated by block 196 storing the calculated statistics, as indicated by block 198, evaluating criteria based on the obtained data, as indicated by block 200, and storing the results of the evaluation, as indicated by block 202. These steps 196, 198, 200, and 202 may be analogous to, or identical to, those performed in steps 182, 184, 186, and 188 and may be performed, for example by the second window analyzer 152 through the nth window analyzer 154, depending upon the identity of the next longer window, for example whether the next longer window is the window corresponding to the second window analyzer 152, a third window analyzer, or the nth window analyzer 154.

Some embodiments of process 176 further include determining whether the next longer window has elapsed (relative to the window analyzed in steps 194, 196, 198, 200, and 202), as indicated by decision block 204. For example, in a use case in which the steps 194-202 are evaluated for data corresponding to a window of the second window analyzer 152, a determination may be made whether the window corresponding to the third window analyzer has elapsed, and during an iteration of steps 194 through 202 in which the third window analyzer window is analyzed, a determination may be made in decision block 204 whether a window corresponding to a fourth window analyzer has elapsed, and so on. Upon determining that the next longer window has elapsed, the process 176 may return to (e.g., recurs to, or initiate a parallel thread or process) initiation block 192, and steps 194 through 204 may be repeated from the perspective of the next longer window, analyzing data that arrive during the next longer window and determining whether the next longer window after that window has elapsed. Upon determining that the next longer window has not elapsed, in response, the process 176 may return to decision block 178.

The process 176, particularly when used in combination with the above-described embodiments of a database engine 130 based on a non-relational database, is expected to facilitate real-time or near real-time displays of, and alerts to, data indicative of the operation of monitored computing instances. For example, some embodiments may be capable of displaying statistics indicative of a change in the operation of a monitored computing instance within an amount of time approximately equal to or less than 2 minutes, 1 minute, 30 seconds, 20 seconds, 10 seconds, 5 seconds, one second, or a half second of a change. This real-time or near real-time response is helpful for users attempting to verify whether a cloud service provider hosting a monitored computing system is meeting a service level agreement. Service-level agreements often specify uptimes on the order of 99.999% uptime, or similar amounts of uptime, and verifying whether this agreement has been met is often easier when real-time, relatively high-resolution data indicative of the operation of monitored computing instances is available, as relatively short interruptions or decreases in performance are more likely to be depicted in a visualization of performance in a user interface or detected with an alarm. Not all embodiments, however, necessarily provide this benefit or provide real-time or near real-time results.

In some embodiments, the computing instances described herein may be executed by a computing device (for example, as the computing device itself or as a virtual machine hosted by the computing device) described below with reference to FIG. 13. Further, the modules, applications, and various functions described above may be implemented by such computing devices having instructions for executing these acts stored in a tangible, non-transitory machine readable medium, e.g., memory, and having one or more processors that, when executing these instructions, cause the computing devices to perform the above-described acts.

Figure 13:
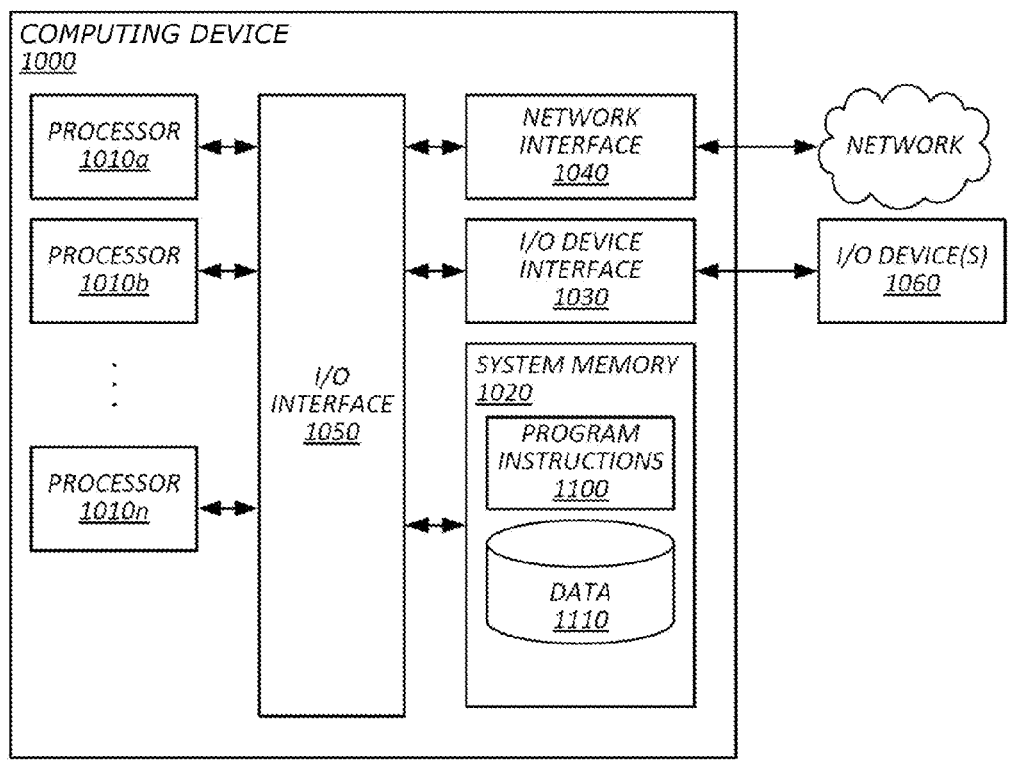
FIG. 13 is an example of a computing device.

FIG. 13 is a diagram that illustrates an exemplary computing device 1000 in accordance with embodiments of the present technique. Various portions of systems and methods described herein, may include or be executed on one or more computer devices similar to computing device 1000. Further, processes and modules described herein may be executed by one or more processing devices similar to that of computing device 1000.

Computing device 1000 may include one or more processors (e.g., processors 1010*a*-1010*n*) coupled to device memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing device 1000 may be a uni-processor device including one processor (e.g., processor 1010*a*), or a multi-processor device including any number of suitable processors (e.g., 1010*a*-1010*n*). Multiple processors or multi-core processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 1000 may include a plurality of computing sub-devices (e.g., distributed computer systems) to implement various processing functions.

I/O device interface 1030 may provide an interface for connection of one or more I/O devices 1060 to computing device 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing device 1000 through a wired or wireless connection. I/O devices 1060 may be connected to computing device 1000 from a remote location. I/O devices 1060 located on remote computer system, for example, may be connected to computing device 1000 via a network and network interface 1040.

Network interface 1040 may include a network adapter that provides for connection of computing device 1000 to a network. Network interface may 1040 may facilitate data exchange between computing device 1000 and other devices connected to the network. Network interface 1040 may support wired or wireless communication. The network may include an electronic communication network, such as the Internet, a local area network (LAN), a wide area network (WAN), a cellular communications network or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., device memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, device memory 1020, network interface 1040, I/O devices 1060 and/or other peripheral devices. I/O interface 1050 may perform protocol, timing or other data transformations to convert data signals from one component (e.g., device memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Some embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computing device 1000 is merely illustrative and is not intended to limit the scope of the techniques described herein. Computing device 1000 may include any combination of devices or software that may perform or otherwise provide for the performance of the techniques described herein. For example, computing device 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or the like. Computing device 1000 may also be connected to other devices that are not illustrated, or may operate as a stand-alone device. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 1000 may be transmitted to computing device 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "an element" includes a combination of two or more elements, notwithstanding use of other terms and phrases for one or more elements. The term "or" is, unless indicated otherwise, non-exclusive, i.e., encompassing both "and" and "or." Terms relating to causal relationships, e.g., "in response to," "upon," "when," and the like, encompass both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A computing-system monitor configured to monitor a plurality of computing-systems each having a plurality of monitored computing-instances, the computing-system monitor comprising:
   one or more processors;
   memory storing instructions that when executed by the one or more processors, cause the processor to instantiate;
   a plurality of collectors, each collector executed by one of a plurality of monitored computing-instances, wherein the plurality of monitored computing-instances each are part of one of a plurality of separately monitored computing systems, and wherein each of the collectors is operable to output metrics of a corresponding monitored computing-instance executing that collector; and
   an analytics platform, the analytics platform executed by a plurality of analytic computing-instances, the analytics platform operable to receive metrics output by the plurality of collectors, calculate statistics with the analytic computing-instances based on the received metrics, and output the calculated statistics,
   wherein each of the separately monitored computing systems is under the control of a different entity, and wherein the analytics platform is operable to associate an account of each entity with the corresponding monitored computing system under the control of that entity, and
   wherein each of the collectors is operable to identify itself to the analytics platform without being prompted to do so by the analytics platform, and wherein the analytics platform is operable to receive data from the collectors after the collectors identify themselves.

2. The computing-system monitor of claim 1, wherein some of the plurality of analytic computing-instances comprise a database engine and a receive engine, the receive engine being operable to receive the metrics output by the plurality of collectors and output the received metrics to the database engine, the database engine being operable to store the received metrics in a non-relational database.

3. The computing-system monitor of claim 1, wherein each of the collectors is operable to push the metrics to the analytics platform at a time determined by the collector.

4. The computing-system monitor of claim 1, wherein the database engine is operable to store the received metrics in a non-predefined hierarchical data structure.

5. The computing-system monitor of claim 1, wherein the analytics platform is capable of outputting calculated statistics within less than 30 seconds of receipt of the received metrics upon which the calculated statistics are based.

6. The computing-system monitor of claim 1, wherein each of the monitored computing instances and the analytics platform are cloud-based virtual machines.

7. The computing-system monitor of claim 1, wherein the metrics comprise processor usage, memory usage, network usage, temperature of a monitored computing instance, and cost of operating a monitored computing instance.

* * * * *